(12) United States Patent
Yeom et al.

(10) Patent No.: US 10,217,349 B2
(45) Date of Patent: Feb. 26, 2019

(54) ELECTRONIC DEVICE AND METHOD FOR CONTROLLING THE ELECTRONIC DEVICE

(71) Applicant: Samsung Electronics Co., Ltd, Gyeonggi-do (KR)

(72) Inventors: Dong-Hyun Yeom, Gyeonggi-do (KR); Kwang-Tai Kim, Gyeonggi-do (KR); Ji-Yoon Park, Gyeonggi-do (KR); Jung-Eun Lee, Gyeonggi-do (KR); Cheol-Ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 15/360,960

(22) Filed: Nov. 23, 2016

(65) Prior Publication Data

US 2017/0148307 A1 May 25, 2017

(30) Foreign Application Priority Data

Nov. 24, 2015 (KR) .......................... 10-2015-0164973

(51) Int. Cl.
| | | |
|---|---|---|
| *G08B 29/18* | (2006.01) | |
| *G05B 19/042* | (2006.01) | |
| *G06F 21/62* | (2013.01) | |
| *G06F 21/31* | (2013.01) | |

(52) U.S. Cl.
CPC ......... *G08B 29/185* (2013.01); *G05B 19/042* (2013.01); *G06F 21/316* (2013.01); *G06F 21/6245* (2013.01); *G05B 2219/31081* (2013.01)

(58) Field of Classification Search
CPC . G08B 29/185; G06F 21/6245; G06F 21/316; G05B 19/042; G05B 2219/31081
See application file for complete search history.

(56) References Cited

U.S. PATENT DOCUMENTS

| | | | | |
|---|---|---|---|---|
| 8,588,979 B2* | 11/2013 | Decuir | ................... | G10L 17/00 382/115 |
| 2014/0368601 A1* | 12/2014 | deCharms | ............. | H04W 4/021 348/14.02 |
| 2015/0242062 A1 | 8/2015 | Mehta et al. | | |
| 2017/0063750 A1* | 3/2017 | Vardhan | ................ | H04L 51/063 |

* cited by examiner

*Primary Examiner* — Brian Wilson

(57) ABSTRACT

An electronic device and a method for controlling the electronic device are provided. The method includes acquiring event information and determining a target user from among a plurality of users to receive the event information, based on stored user information. Additionally, the method includes acquiring device information about at least one of the electronic device and at least one external electronic device corresponding to the target user, determining a target device to provide the event information, based on the device information, and then providing an event output signal for outputting the event information, to the target device. Further, the method includes determining a method for outputting the event information through the target device, based on an event output scheme of the target device, and a privacy level of the event information.

20 Claims, 16 Drawing Sheets

ELECTRONIC DEVICE AND METHOD FOR CONTROLLING THE ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Nov. 24, 2015 and assigned Serial No. 10-2015-0164973, the entire disclosure of which is incorporated herein by reference.

TECHNICAL FIELD

The present disclosure relates generally to an electronic device and a method for controlling the electronic device, and more particularly, to an electronic device for providing information related to an event, and a method for controlling the electronic device.

BACKGROUND

A robot is a machine that resembles humans in looks and functionality or a machine designed to execute tasks automatically.

A robot automated to perform assembly, welding, handling, and so on in a factory is called an industrial robot, and a robot capable of perceiving an environment and making a decision autonomously is called an intelligent robot. An android is a robot designed to look and act like a human, especially one with a body having a flesh-like resemblance.

Owing to the development of robot technology, robots find their applications in a wide range of fields including industry, medicine, home, and military.

In particular, as the robots can properly provide a variety of information to the users, technologies or services providing information through the robots have been developed.

Accordingly, upon generation of a message or an event, an electronic device like a robot may provide the generated message or event to a user through a screen or a speaker.

As the electronic device outputs event information, it may occur that some event information including personal information is exposed to others, thus violating privacy.

Moreover, if event information is simply output with no regard to the environment of the user or the state of the electronic device, the user may not receive the event information effectively.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an electronic device for effectively providing event information to a user by determining the contents of the acquired event information, and a method for operating the electronic device.

Various embodiments of the present disclosure provide a method for determining a privacy level of event information and outputting the event information in an event output method corresponding to the privacy level in order to protect the privacy of an individual.

In accordance various embodiments of the present disclosure, there is provided an electronic device. The electronic device includes a memory for storing user information about a plurality of users, and a processor. The processor is configured to acquire event information about an event sensed by a sensor operatively connected to the electronic device, to determine first and second users from among the plurality of users to be candidate users to receive at least part of the event information, based on at least the user information, to acquire situation information about the electronic device, a first external electronic device corresponding to the first user, or a second external electronic device corresponding to the second user, to select a first electronic device set as a target electronic device from among the electronic device, the first external electronic device, and the second electronic device, if the situation information satisfies a first predetermined condition for the event information, and to select a second electronic device set as a target electronic device from among the electronic device, the first external electronic device, and the second electronic device, if the situation information satisfies a second predetermined condition for the event information, and to provide at least part of the event information to the target electronic device.

In accordance with various embodiments of the present disclosure, there is provided an electronic device. The electronic device includes a memory for storing user information about a plurality of users, and a processor. The processor is configured to acquire event information about an event sensed by a sensor operatively connected to the electronic device, to determine at least one of the plurality of users to be a candidate user to receive at least part of the event information, based on at least the user information, to acquire situation information about the electronic device or at least one external electronic device corresponding to the candidate user, to provide at least part of the event information to the at least one external electronic device, if the situation information satisfies a predetermined condition for the event information, and not to provide the at least part of the event information to the at least one external electronic device, if the situation information does not satisfy the predetermined condition for the event information.

In accordance with various embodiments of the present disclosure, there is provided an electronic device. The electronic device includes a memory for storing user information about a plurality of users, and a processor connected electrically to the memory. The memory stores instructions configured to, when executed, control the processor to acquire at least one piece of event information, to determine at least one target user to receive the event information from among the plurality of users, based on the stored user information, to acquire device information about at least one of the electronic device and at least one external electronic device corresponding to the determined at least one target user, to determine at least one target device to provide the event information, based on the acquired device information, and to provide an event output signal for outputting the event information, to the determined at least one target device.

In accordance with various embodiments of the present disclosure, there is provided a method for operating an electronic device. The method includes acquiring at least one piece of event information, determining at least one target user to receive the event information, from among a plurality of users based on stored user information, acquiring device information about at least one of the electronic device and at least one external electronic device corresponding to the determined at least one target user, determining at least one target device to provide the event information, based on the acquired device information, and providing an event output signal for outputting the event information, to the determined at least one target device.

Other embodiments, aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1A:
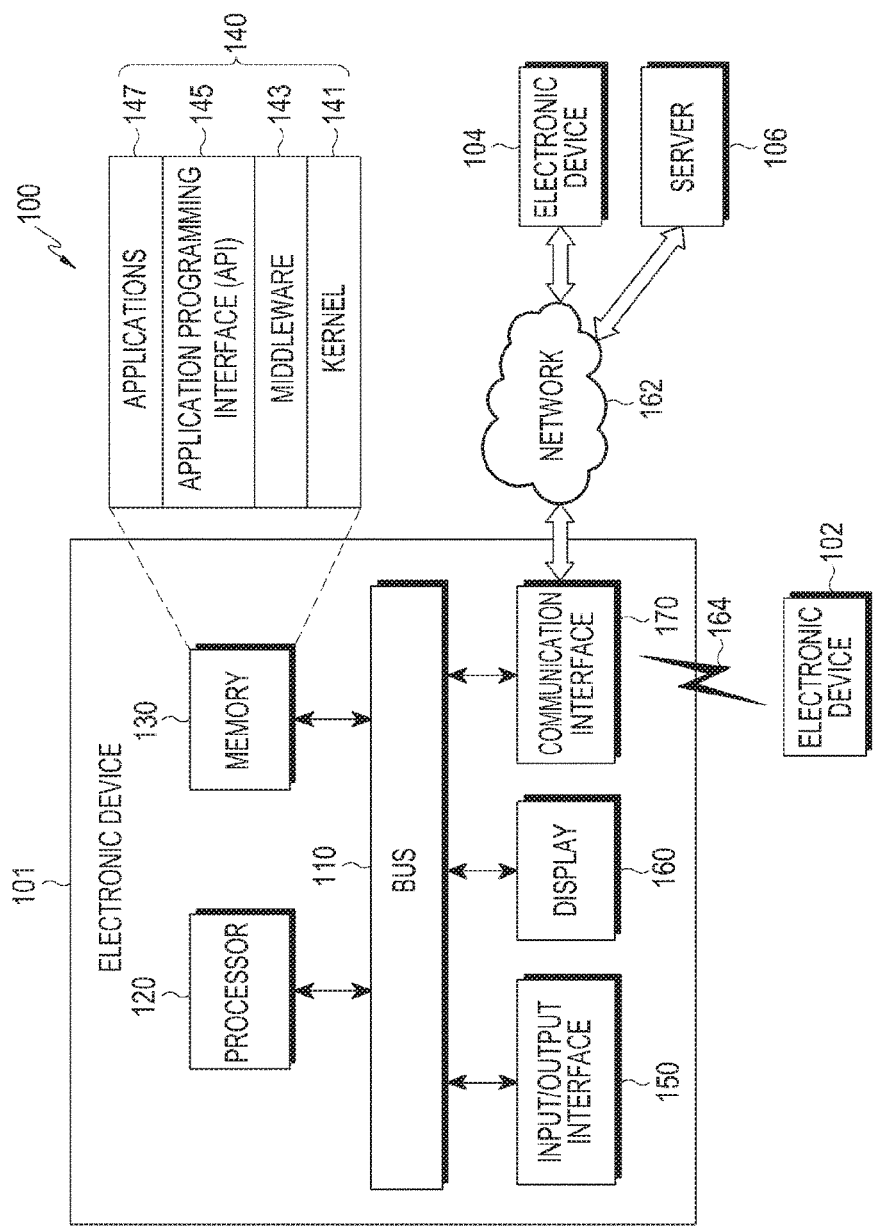
FIG. 1A is a block diagram illustrating an electronic device and a network according to various embodiments of the present disclosure.

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present disclosure are described with reference to the accompanying drawings. However, the scope of the present disclosure is not intended to be limited to the particular embodiments and it is to be understood that the present disclosure covers all modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component such as part), not excluding the presence of one or more other features.

In present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the examples of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to various embodiments of the present disclosure may be at least one of, for example, a smartphone, a tablet personal computer (PC), a mobile phone, a video phone, an e-book reader, a desktop PC, a laptop PC, a netbook computer, a workstation, a server, an personal digital assistant (PDA), a portable multimedia player (PMP), an MP3 player, a mobile medical equipment, a camera, or a wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), a body-attached type (for example, a skin pad or a tattoo), or an implantable type (for example, an implantable circuit).

According to some embodiments, an electronic device may be a home appliance. For example, the home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MM) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may be at least one of furniture, part of a building/structure, an electronic board, an electronic signature receiving device, a projector, and various measuring devices (for example, water, electricity, gas or electro-magnetic wave measuring devices). According to various embodiments, an electronic device may be one or a combination of two or more of the foregoing devices. According to some embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments will be described below. In the present disclosure, the term 'user' may refer to a person or device (for example, artificial intelligence electronic device) that uses an electronic device.

Referring to FIG. 1A, an electronic device 101 in a network environment 100 according to various embodiments is described. The electronic device 101 may include a bus 110, a processor 120, a memory 130, an input/output (I/O) interface 150, a display 160, and a communication module 170. In some embodiments, at least one of the components may be omitted in the electronic device 101 or a component may be added to the electronic device 101.

The bus 110 may include a circuit that interconnects, for example, the foregoing components 120, 130, 150, 160, and 170 and allows communication (for example, control messages and/or data) between the foregoing components.

The processor 120 may include one or more of a CPU, an AP, a communication processor (CP), a graphic processor (GP), a multi-chip package (MCP), or an image processor (IP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs such as the middleware 143, the API 145, or the application programs 147. Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is an interface for the applications 147 to control functions that the kernel 141 or the middleware 143 provides. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device. The I/O interface 150 may include a touch input device, a voice input unit, various remote control devices, and so on. The I/O interface 150 may be at least one means for providing a specific service to the user. For example, if information to be provided is a sound, the I/O interface 150 may be a speaker. If information to be provided is text or video content, the I/O interface 150 may be a display device. Further, if the user is not near to the electronic device 101, data for a service may be provided to at least one other electronic device through a communication module, and output from the at least one other electronic device. The at least one other electronic device may be a speaker or another display device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication module 170 may establish communication, for example, between the electronic device 101 and an external device (for example, a first external electronic device 102, a second external electronic device 104, or a server 106). For example, the communication module 170 may be connected to a network 162 by wireless communication or wired communication, and communicate with the external device (for example, the second external electronic device 104 or the server 106) over the network 162.

The wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. Also, the wireless communication may include, for example, short-range communication 164. The short-range communication 164 may be conducted by, for example, at least one of wireless fidelity (WiFi), Bluetooth®, near field communication (NFC), or GNSS. GNSS may include, for example, at least one of global positioning system (GPS), global navigation satellite system (Glonass®, Beidou® navigation satellite system (hereinafter, referred to as 'Beidou'), or Galileo®, the European global satellite-based navigation system, according to a region using the GNSS or a used bandwidth. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a communication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (for example, the electronic devices 102 and 104) or the server 106. According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 1B:
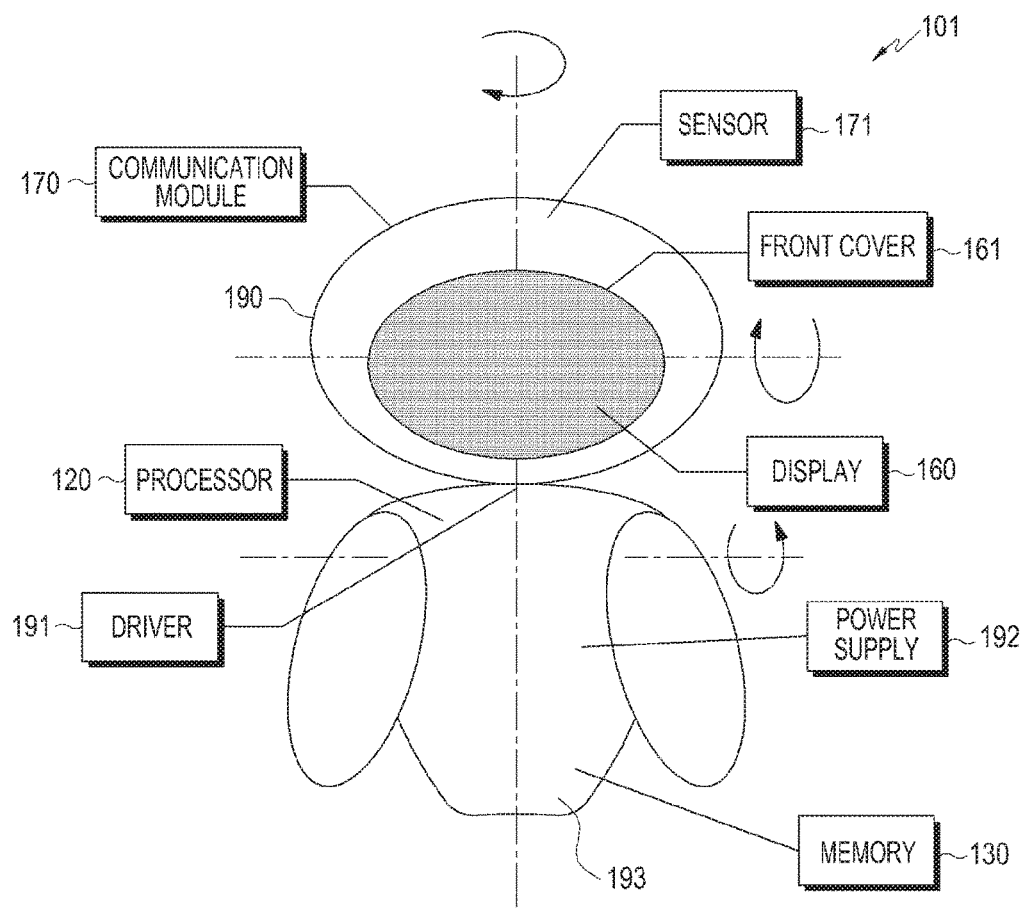
FIG. 1B is a conceptual view illustrating an implementation example of an electronic device according to various embodiments of the present disclosure.

FIG. 1B is a conceptual view illustrating an implementation example of an electronic device according to various embodiments of the present disclosure.

Referring to FIG. 1B, the electronic device 101 may be implemented in the form of a robot. The electronic device 101 may include a head 190 and a body 193. The head 190 may be mounted on top of the body 193. The head 190 and the body 193 may be configured in the forms of a human head and body, respectively in an embodiment. For example, the head 190 may include a front cover 161 corresponding to a human face.

The electronic device 101 may include the display 160 at a predetermined position of the front cover 161. For example, the display 160 may be disposed inside the front cover 161. In this embodiment, the front cover 161 may be formed of a transparent or semi-transparent material. Or the front cover 161 may be a device capable of displaying any screen. In this embodiment, the front cover 161 and the display 160 may be configured into one hardware unit. The front cover 161 may include at least one sensor, at least one microphone, mechanical eye structures, and a display. The at least one sensor may sense an image in a direction of interacting with a user, the at least one microphone may acquire voice from the interaction direction, and the display outputs a screen. If the direction of interacting with a user is not distinguishable from other directions, the front cover 161 may emit light or perform a temporary mechanical change. The front cover 161 may include at least one hardware or mechanical structure for directing the front cover 161 toward a user, for interacting with the user.

The head 190 may further include the communication module 170 and a sensor 171. The communication module 170 may receive a message from a transmission apparatus and transmit a converted message to a reception apparatus. In another embodiment, the communication module 170 may be configured as a microphone. In an embodiment, the communication module 170 may receive voice from a user. In another embodiment, the communication module 170 may be configured as a speaker. In an embodiment, the communication module 170 may output a converted message by voice.

The sensor 171 may acquire at least one piece of information about an ambient environment. For example, the sensor 171 may be configured as a camera. In an embodiment, the sensor 171 may capture the ambient environment. The electronic device 101 may identify a receiver according to a capturing result. The sensor 171 may sense proximity of the receiver to the electronic device 101. The sensor 171 may sense proximity of the receiver according to proximity information or a signal of an electronic device used by the receiver. Further, the sensor 171 may sense a behavior and a position of the user.

A driver 191 may include at least one motor for moving the head 190. For example, the driver 171 may change a direction of the head 190. The driver 191 may also be used to move the electronic device 101 and mechanically change other components. Accordingly, the electronic device 101 may move by operation of the driver 191. The driver 191 may be configured into a form capable of moving up and down or sideways around at least one axis. The driver 191 may be configured in various forms.

A power supply 192 may supply power to the electronic device 101.

The memory 130 is a storage medium capable of permanently or temporarily storing information related to provisioning of a service to the user. The memory 130 may reside inside the electronic device 101, or in a cloud or another server through a network. The memory 130 may store personal information for user authentication, attribute information related to a service providing scheme for the user, or information about relationships between various components interacting with the electronic device 101. As the electronic device 101 is used, the relationship information may be changed through update or learning. The processor 120 is responsible for controlling the electronic device 101, and enables a service to be provided to the user by operatively controlling the sensor 171, the I/O interface 150, the communication module 170, and the memory 130. In addition, an information decider for determining information acquirable by the electronic device 101 may be included in at least a part of the processor 120 or the memory 130. The information decider may extract at least one data for a service from information acquired through the sensor 171 or the communication module 170.

Meanwhile, configuration of the electronic device 101 in the form of a robot is purely exemplary. Thus, the electronic device 101 may be configured in any other form. For example, the electronic device 101 may be configured as a single robot entity, that is, a stand-alone type. The electronic device 101 may be configured as a docking station type for fixing a tablet PC or a smartphone. Also, the electronic device 101 may be classified as a fixed type or a mobile type according to its mobility. Mobile types include a wheel-based one, a caterpillar-based one, a leg movement-based one (with two legs or four legs), a flying-type one, or a rail-moving one.

Figure 2A:
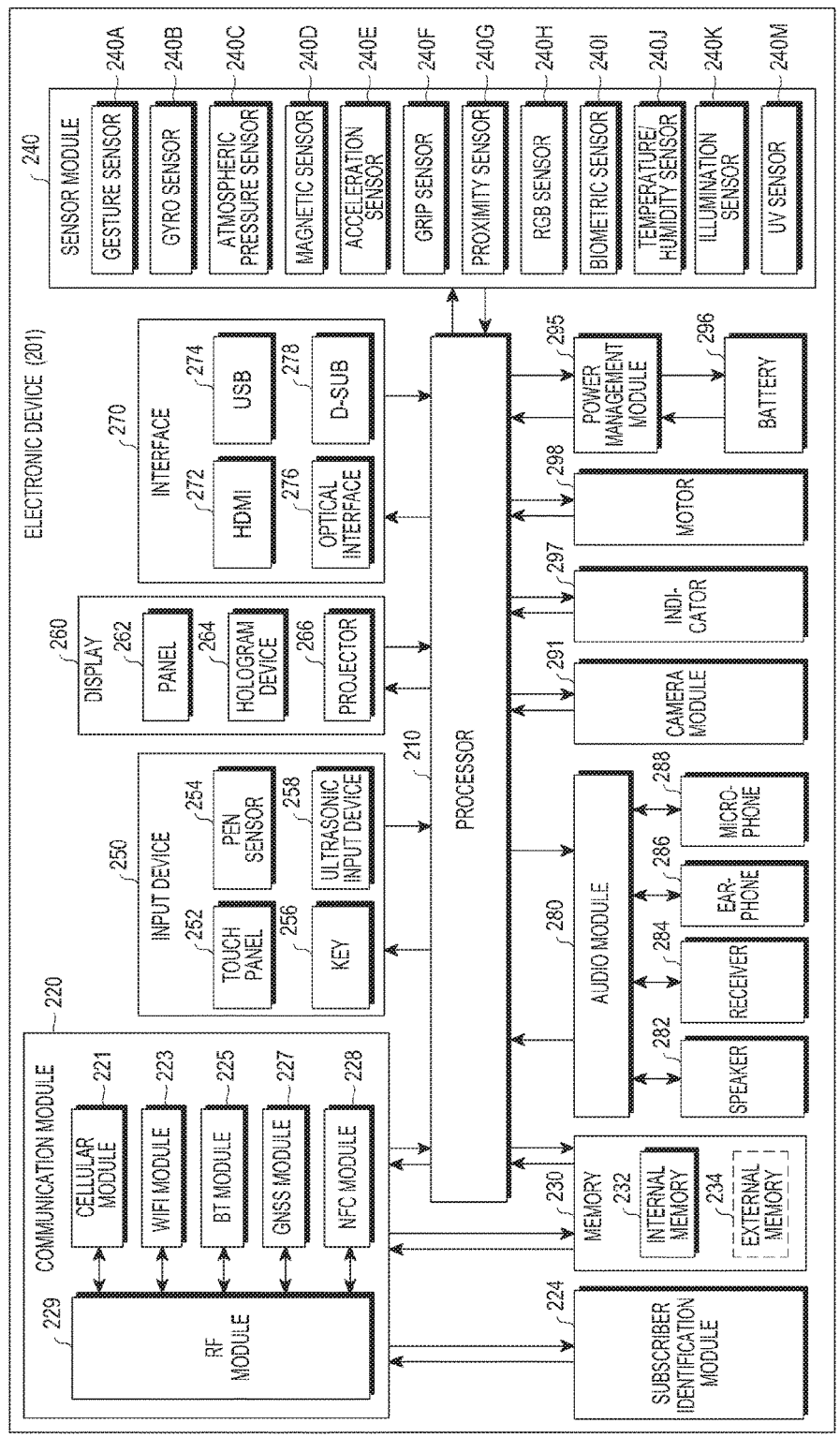
FIG. 2A is a block diagram illustrating an electronic device according to various embodiments.

FIG. 2A is a block diagram of an electronic device 201 according to various embodiments. The electronic device 201 may include, for example, the whole or part of the electronic device 101 illustrated in FIGS. 1A and 1B. The electronic device 201 may include at least one processor (for example, AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 (for example, the processor 120) may, for example, control a plurality of hardware or software components that are connected to the processor 210 by executing an OS or an application program, and may perform processing or computation of various types of data. The processor 210 may be implemented, for example, as a system on chip (SoC). According to an embodiment, the processor 210 may further include a graphics processing unit (GPU) and/or an image signal processor. The processor 210 may include at least a part (for example, a cellular module 221) of the components illustrated in FIG. 2A. The processor 210 may load a command or data received from at least one of other components (for example, a non-volatile memory), process the loaded command or data, and store various types of data in the non-volatile memory.

The communication module 220 may have the same configuration as or a similar configuration to the communication module 170 illustrated in FIG. 1. The communication module 220 may include, for example, the cellular module 221, a WiFi module 223, a Bluetooth® (BT) module 225, a GNSS module 227 (for example, a GPS module, a Glonass® module, a Beidou® module, or a Galileo® module), an NFC module 228, and a radio frequency (RF) module 229.

The cellular module 221 may provide services such as voice call, video call, text service, or the Internet service, for example, through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP.

Each of the WiFi module 223, the BT module 225, the GNSS module 227, and the NFC module 228 may include, for example, a processor that may process data received or transmitted by the module. According to an embodiment, at least a part (for example, two or more) of the cellular module 221, the WiFi module 223, the BT module 225, the GNSS module 227, or the NFC module 228 may be included in a single integrated chip (IC) or IC package.

The RF module 229 may transmit and receive, for example, communication signals (for example, RF signals). The RF module 229 may include at least one of, for example, a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD).

The external memory 234 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262, a hologram device 264, or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. According to an embodiment, the panel 262 may include a pressure sensor (or "force sensor") for measuring the pressure strength of a user touch. The pressure sensor may be integrated with the panel 262 or may be configured as one or more sensors separately from the panel 262. Hereafter, the terms pressure sensor and force sensor may be interchangeable with each other. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication module 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp).

The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. While not shown, the electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO®.

Figure 2B:
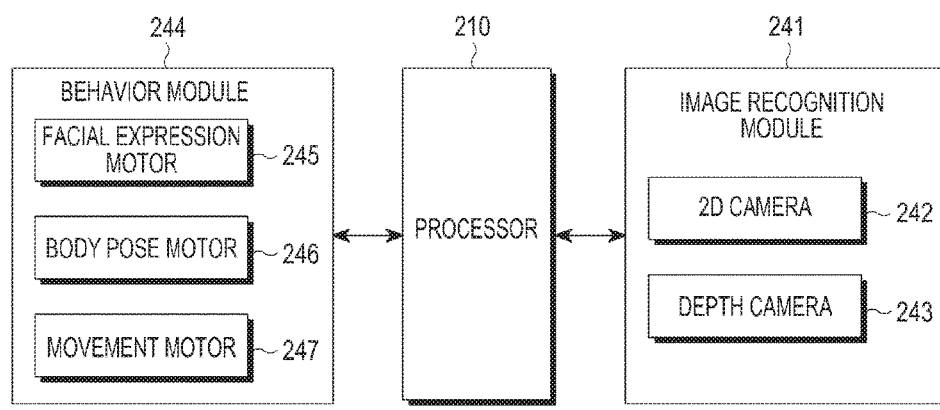
FIG. 2B is a block diagram illustrating an electronic device according to various embodiments of the present disclosure.

FIG. 2B is a block diagram of an electronic device according to various embodiments of the present disclosure.

Referring to FIG. 2B, the processor 210 may be connected to an image recognition module 241. The processor 210 may also be connected to a behavior module 244. The image recognition module 241 may include at least one of a two-dimensional (2D) camera 242 and a depth camera 243. The image recognition module 241 may perform recognition based on a capturing result, and provide a recognition result to the processor 210. The behavior module 244 may include at least one of a facial expression motor 245, a body pose motor 245, and a movement motor 247. The processor 210 may control movement of the electronic device 101 implemented in the form of a robot by controlling at least one of the facial expression motor 245, the body pose motor 245, and the movement motor 247. The electronic device 101 may include the components illustrated in FIG. 2B in addition to the components illustrated in FIG. 2A. The behavior module 244 may be included in the driver 191.

Figure 3:
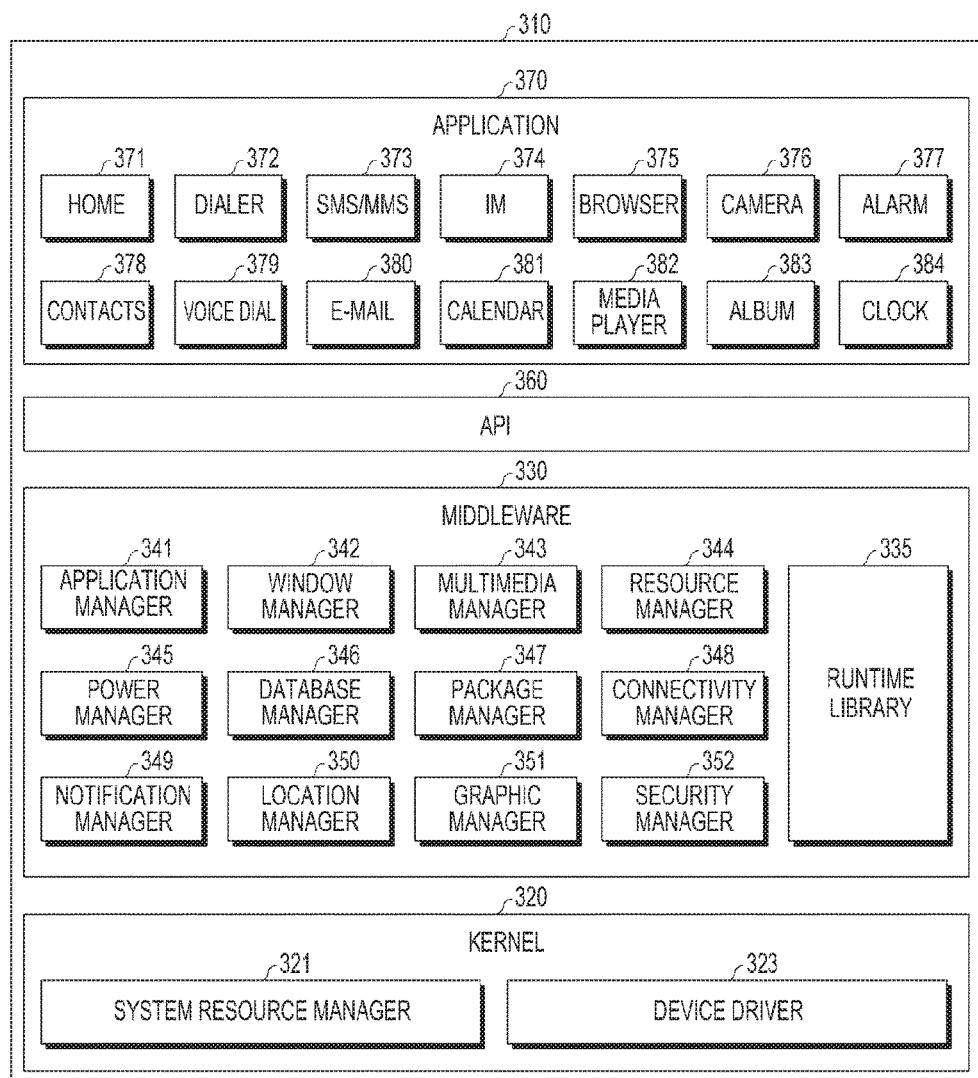
FIG. 3 is a block diagram illustrating a programming module according to various embodiments.

FIG. 3 is a block diagram of a programming module according to various embodiments. According to an embodiment, a programming module 310 (for example, a program 140) may include an OS that controls resources related to an electronic device (for example, the electronic device 101) and/or various applications executed on the OS (for example, the application programs 147). For example, the OS may be Android®, iOS®, Windows®, Symbian®, Tizen®, Bada®, or the like.

The programming module 310 may include a kernel 320, middleware 330, an Application Programming Interface (API) 360, and/or applications 370. At least a part of the programming module 310 may be preloaded on the electronic device or downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or deallocate system resources. According to an embodiment, the system resource manager 321 may include a process manager, a memory manager, a file system manager, or the like. The device driver 323 may include, for example, a display driver, a camera driver, a Bluetooth® driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS) and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, Bluetooth®, or the like. The notification manager 349 may indicate or notify an event such as message arrival, a schedule, a proximity notification, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. In an embodiment, if the electronic device (for example, the electronic device 101) has a telephony function, the middleware 330 may further include a telephony manager to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component.

The API 360 (for example, the API 145) is, for example, a set of API programming functions, which may be configured differently according to an OS. For example, in an embodiment including Android® or iOS®, one API set may be provided per platform, whereas in an embodiment using Tizen®, two or more API sets may be provided per platform.

The applications 370 (for example, the application programs 147) may include, for example, one or more applications capable of providing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (for example, measurement of an exercise amount or a glucose level), or providing of environment information (for example, information about atmospheric pressure, humidity, or temperature).

According to an embodiment, the applications 370 may include an application (for the convenience of description, referred to as 'information exchange application') supporting information exchange between the electronic device (for example, the electronic device 101) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 102 or 104). Also, the notification relay application may, for example, receive notification information from the external electronic device and transmit the received notification information to a user.

The device management application may, for example, manage (for example, install, delete, or update) at least a part of functions of the external electronic device (for example, the electronic device 102 or 104) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 370 may include (an application (for example, a health care application of a mobile medical equipment) designated according to) a property of the external electronic device (for example, the electronic device 102 or 104). According to an embodiment, the applications 370 may include an application received from an external electronic device (for example, the server 106 or the electronic device 102 or 104). According to an embodiment, the applications 370 may include a preloaded application or a third party application downloadable from a server. The names of components of the programming module 310 according to the embodiment of the present disclosure may vary according to the type of an OS.

Figure 4:
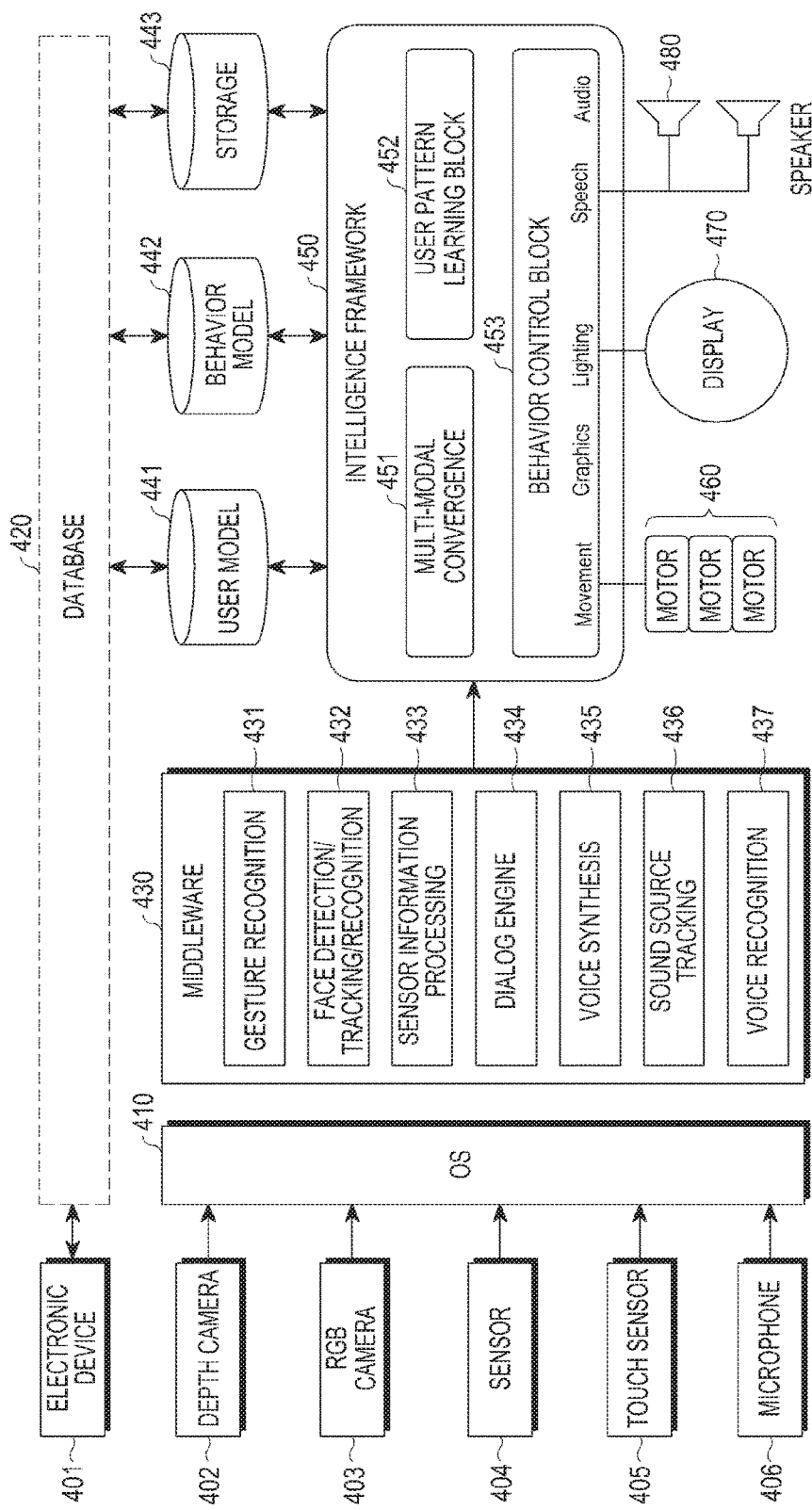
FIG. 4 is a block diagram illustrating software used in an electronic device according to various embodiments of the present disclosure.

FIG. 4 is a block diagram illustrating software used in an electronic device according to various embodiments of the present disclosure.

An OS 410 may perform general OS functionalities including resource distribution, job scheduling processing, and the like for the electronic device 101. At the same time, the OS 410 may control various hardware devices 402, 403, 404, 405, and 406, and process signals received from the hardware devices 402, 403, 404, 405, and 406.

Middleware 430 may perform, using signal-processed data, three-dimensional (3D) gesture recognition 431 for a user, authentication 432 through detection and tracking of the position of the face of the user or recognition of the face, sensor information processing 433, dialog engine driving 434, voice synthesis 435, direction of arrival (DOA) tracking 436 for an audio signal, and voice recognition 437.

An intelligence framework 450 may include a multi-modal convergence block 451, a user pattern learning block 452, and a behavior control block 453. The multi-modal convergence block 451 may collect and manage various types of information processed by the middleware 430. The user pattern learning block 452 may extract and learn meaningful information such as a living pattern, preferences, and the like of the user using information from the multi-modal convergence module 451. The behavior control block 453 may represent information that the electronic device 101 will feed back to the user as movement of the electronic device 101, graphics, light, voice, a response, speech (sound), or the like.

A motor 460 may represent a motion, a display 470 may represent graphics and light, and a speaker 480 may represent voice, a response, and sound.

A database 420 may store information learned by the intelligence framework 450 according to users. The database 420 may include a user model database 441, a model database for behavior control 442 of the electronic device, and a storage 443 for storing other information. Information of the database 420 may be shared with another electronic device 401.

Figure 5:
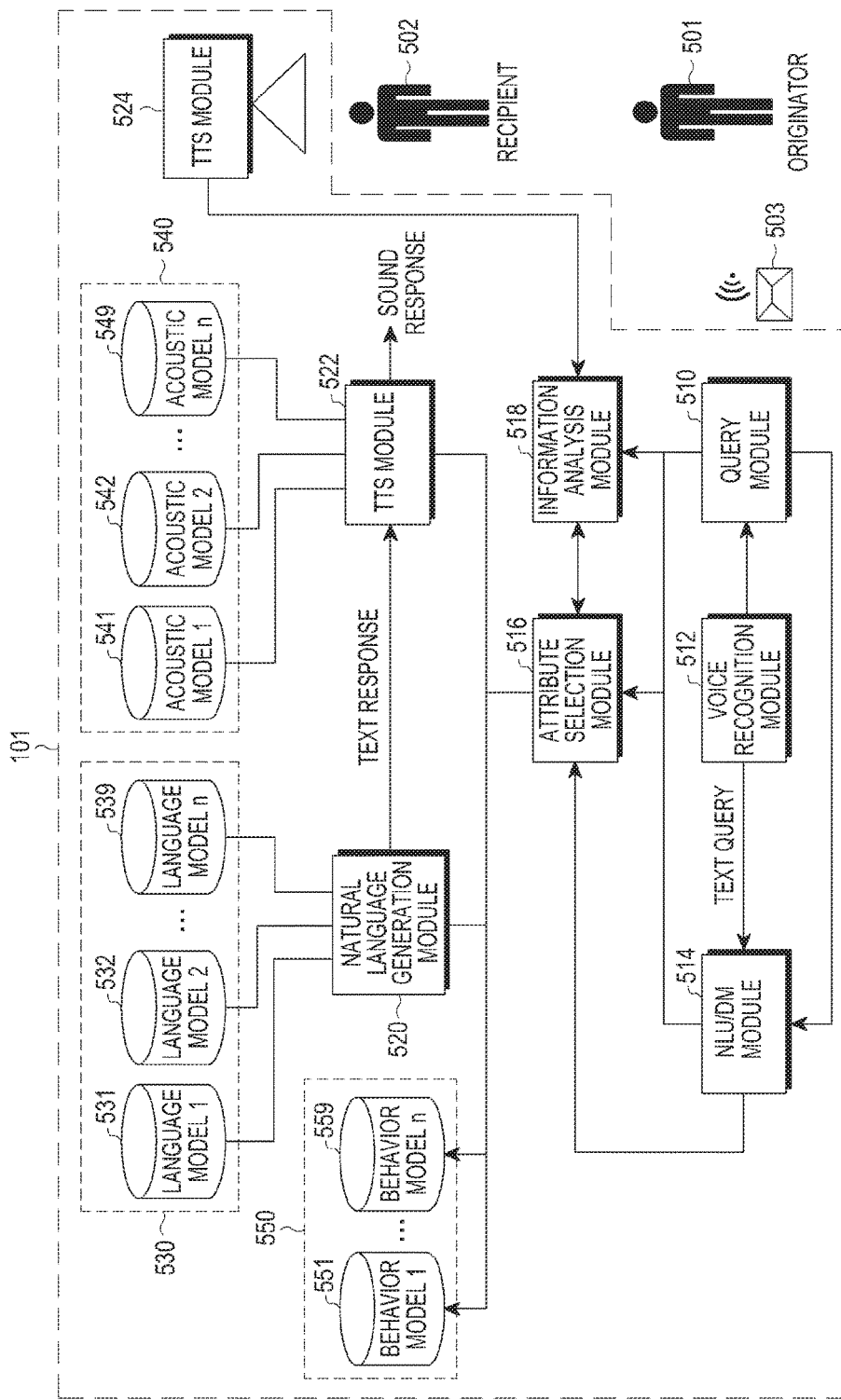
FIG. 5 is a block diagram illustrating voice recognition and voice output in an electronic device according to various embodiments of the present disclosure.

FIG. 5 is a block diagram referred to for describing voice recognition and voice output in an electronic device according to various embodiments of the present disclosure.

The electronic device 101 may receive a voice message 503 from an originator 501. For example, the electronic device 101 may receive the voice message 503 through a query module 510. The query module 510 may be a module that acquires voice.

A voice recognition module 512 of the electronic device 101 may recognize the voice of the received voice message 503.

Also, the electronic device 101 may analyze information about the received voice message 503. For example, an information analysis module 518 of the electronic device 101 may analyze the information about the received voice message 503. Also, the information analysis module 518 may analyze the information about the received voice message 503 or determine a recipient 502 of the received voice message 503, based on a sensing value received from a sensing module 524.

An attribute selection module 516 of the electronic device 101 may select an attribute of the received voice message 503. The attribute selection module may determine the recipient 502 based on the information analyzed by the information analysis module 518.

The voice recognition module 512 may convert the voice of the recognized voice message to a text query. A natural language understanding (NLU)/dialog management (DM) module 514 may perform NLU/DM using the text query. The NLU/DM module 514 may also recognize text as a sentence through NLU/DM. The NLU/DM module 514 may acquire at least one of intent, a parameter, and content through NLU/DM. The attribute selection module 516 may select an attribute using the at least one of the intent, the parameter, and the content.

A natural language generation module 520 of the electronic device 101 may select at least one language model based on the determined attribute. For example, the natural language generation module 520 may select at least one language model from a language model group 530 including a plurality of language models 531 to 539 based on the attribute selected by the attribute selection module 516. The natural language generation module 520 may determine at least one text generation parameter.

The electronic device 101 may determine a behavior model based on the selected attribute. For example, the electronic device 101 may determine at least one behavior model from a behavior model group 550 including a plurality of behavior models 551 to 559 based on the attribute selected by the attribute selection module 516.

The electronic device 101 may determine an acoustic model based on the selected attribute. For example, the electronic device 101 may determine at least one acoustic model from an acoustic model group 540 including a plurality of acoustic models 541 to 549 based on the attribute selected by the attribute selection module 516. For example, the electronic device 101 may determine at least one voice generation parameter to output the converted text through the natural language generation module 520. Also, the electronic device 101 may output a sound response (for example, a voice response) according to the selected acoustic model.

A text to speech (TTS) module 522 of the electronic device 101 may perform voice synthesis (text to speech conversion) and output a sound response.

As described above, the electronic device 101 may change factors for the natural language generation module 520 and the TTS module 522 according to a relationship between at least one entity, or contents to be provided. Therefore, the electronic device 101 may provide an appropriate sound response to a user interacting with the electronic device 101.

In the process of attribute selection, the electronic device 101 may use a vision for identifying one or more users and an environment, a sensing value such as a voice value, connectivity, personal profile data, and the like as well as the contents of a message to be provided.

The electronic device 101 may determine a different language model according to a receiver and the electronic device 101. For example, if the relationship between the receiver and the electronic device 101 is set as friends through a preliminary setting or learning, a language model for constructing friendly words and sentences may be selected. In another example, if an urgent message is to be provided to a user, the electronic device 101 may select an acoustic model characterized by a fast and clear tone. In another embodiment, if a receiver is placed in an environment in which it is difficult to hear voice of a high frequency band, the electronic device 101 may select an acoustic model of a low frequency band.

Figure 6:
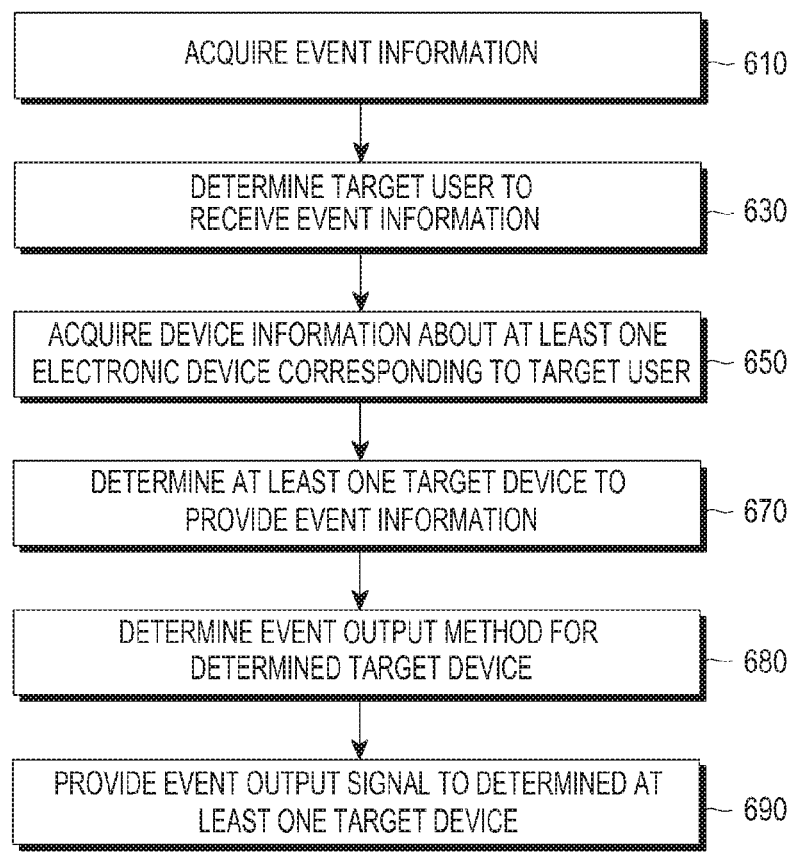
FIG. 6 is a flowchart illustrating an operation method according to various embodiments of the present disclosure.

FIG. 6 is a flowchart illustrating an operation method according to various embodiments of the present disclosure.

Referring to FIG. 6, the electronic device 101, for example, the processor 120 may acquire event information in operation 610. In an embodiment, the electronic device 101 may acquire event information in the form of voice from a user through the microphone 288. In another embodiment, the electronic device 101 may acquire event information through the communication module 220. The event information may be information about various events. For example, the event information may include at least one of the type of an event corresponding to the event information, an event time, an event importance level, event contents, a privacy level, and information about a target user corresponding to the event.

In operation 630, the electronic device 101, for example, the processor 120 may determine a target user to receive the acquired event information. The processor 120 may determine a target user to receive the event information based on at least one of the type of an event corresponding to the event information, an event time, an event importance level, event contents, a privacy level, and information about a target user corresponding to the event. The target user may refer to a candidate user.

In an embodiment, the electronic device 101 may determine a user corresponding to a destination indicated by the event information as the target user to receive the acquired event information.

In another embodiment, the electronic device 101 may determine another user related to the user corresponding to the destination indicated by the event information as the target user to receive the acquired event information. For example, the electronic device 101 may acquire event information related to an event of a plurality of users moving to the same destination. If determining that the user or an electronic device corresponding to the user is not appropriate to receive the event information at present, the electronic device 101 may provide the event information to one of the plurality of users.

In operation 650, the electronic device 101, for example, the processor 120 may acquire device information about at least one electronic device corresponding to the determined target user. In an embodiment, the electronic device 101 may receive device information about at least one electronic device corresponding to the determined target user through the communication module 220. In another embodiment, the electronic device 101 may acquire device information related to at least one electronic device corresponding to the determined target user from a database stored in the memory 130. The database stored in the memory 130 may be a database related to user information or device information. The device information may include at least one of the type, position, and ambient environment of the electronic device 101 or the external electronic device 102, information about at least one user using the electronic device 101 or the external electronic device 102, and a distance between the at least one user and the electronic device 101 or the external electronic device 102.

Meanwhile, the electronic device 101 may acquire device information related to an electronic device located in a predetermined area other than the electronic device corresponding to the determined target user. The electronic device 101 may also acquire device information related to an electronic device located within a predetermined distance from the determined target user.

In operation 670, the electronic device 101, for example, the processor 120 may determine at least one target device to which the event information is to be transmitted, based on the acquired device information. For example, the electronic device 101 may determine a target device to which the event information is to be transmitted from among at least one electronic device corresponding to the determined target user, based on the acquired device information. The target device may include a target electronic device, and the device information may be included in situation information. In addition, the situation information may include user information.

In an embodiment, the electronic device 101 may determine an electronic device that does not violate the privacy of the determined target user as a target device to which the event information is to be transmitted, based on the acquired device information. Therefore, the electronic device 101 may determine an electronic device that only the target user uses as the target device.

In another embodiment, the electronic device 101 may determine, as a target device, a common device through which a group of determined target users may easily receive the event information, based on the acquired device information. Thus, the electronic device 101 may determine the common device through which the group corresponding to the event information may receive the event information, as a target device.

In operation 680, the electronic device 101, for example, the processor 120 may determine an event output method for outputting the event at the determined target device. The event output method may include at least one of an event output scheme, an event display level, and an event display time. The event output scheme may use at least one of an audio, a video, and text, and the event display level may be a degree to which the contents of the event are displayed. The event display time may be a time at which the event is displayed.

In an embodiment, the electronic device 101 may output the event information visually and output the whole contents of the event, as the event output method.

In another embodiment, the electronic device 101 may output the event information audibly and output part of the contents of the event, as the event output method.

In operation 690, the electronic device 101, for example, the processor 120 may transmit an event output signal indicating event output to the determined at least one target device. The event output signal may include event output information for outputting the event information. For example, the event output signal may include the event information, target user information, target device information, and information about the event output method. The event output signal may also include information about a later-described event profile. Upon receipt of the event output signal, the at least one target device may output the event information based on the received event output signal. Therefore, the target device may output the event information in the determined event output method.

According to various embodiments of the present disclosure, the electronic device 101 may process acquired event information and generate an event profile based on the processed event information. The electronic device 101 may determine a target device and an event output method through which the generated event profile is to be provided to a user.

Figure 7:
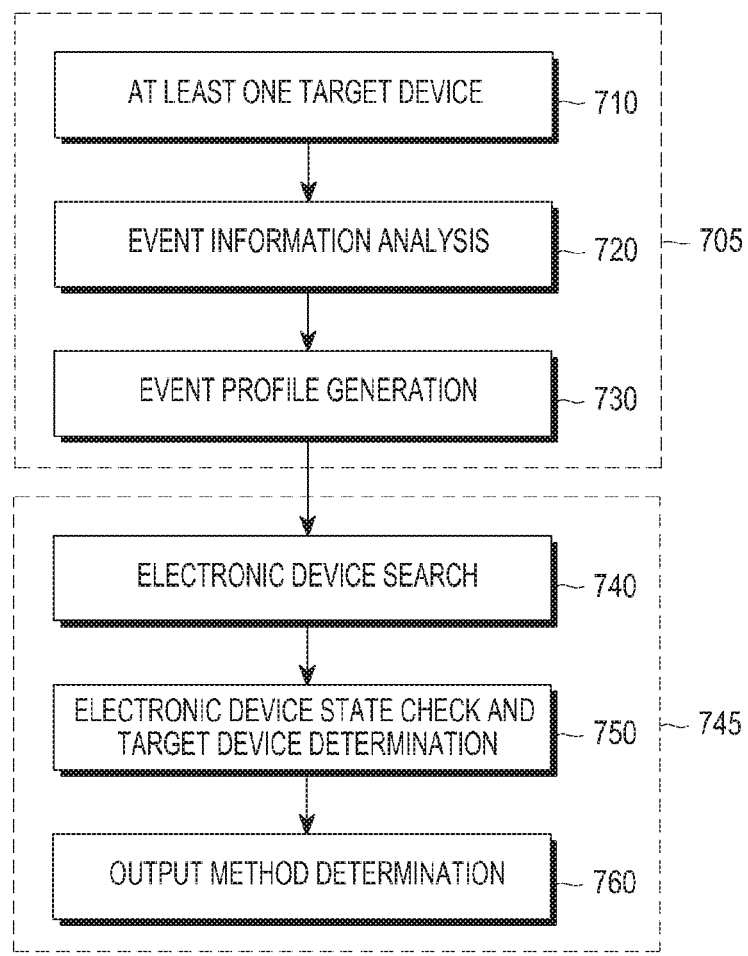
FIG. 7 is a flowchart illustrating a method for operating an electronic device according to various embodiments of the present disclosure.

FIG. 7 is a flowchart illustrating a method for operating an electronic device according to various embodiments of the present disclosure.

Referring to FIG. 7, the electronic device 101 may process acquired event information in operation 705. The event processing operation may include event information acquisition, event information analysis, and event profile generation.

In operation 710, the electronic device 101 may acquire the event information. In an embodiment, the electronic device 101 may acquire the event information in the form of voice from a user through the microphone 288. In another embodiment, the electronic device 101 may acquire the event information through the communication module 220. The event information may refer to information about various events. For example, the event information may include at least one of the type of an event corresponding to the event information, an event time, an event importance level, event contents, a privacy level, and information about a target user corresponding to the event.

In an embodiment, the event information may be information about an event that an electronic device, for example, a robot may receive in a smart home. For example, the event information may be information about a visitor to the smart home, weather information, danger information, politics/society section news information, information about an event related to an individual terminal of each family member (for example, an event related to a call, a message, a social networking service (SNS), an alarm, or the like), information about a common family schedule, or information about a personal schedule of each family member.

The event information may be comprised of a plurality of fields.

The event information will be described in greater detail with reference to FIG. 8.

Figure 8:
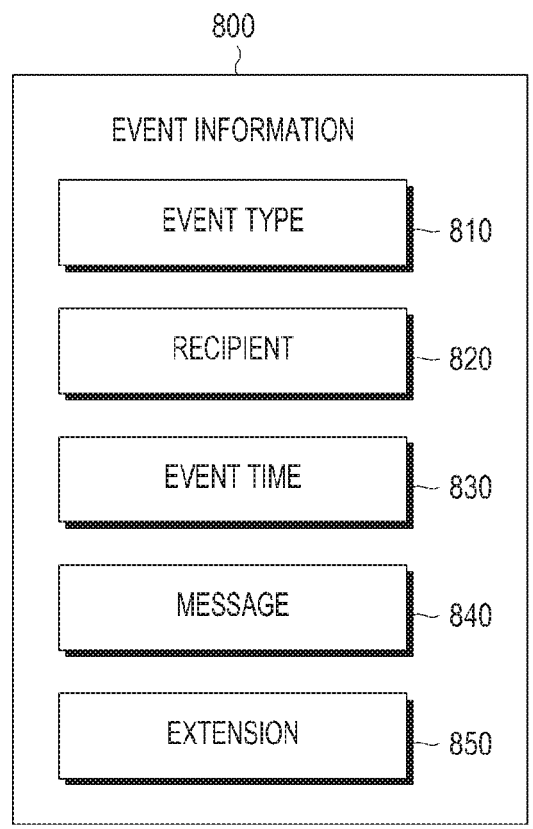
FIG. 8 is a diagram illustrating a structure of event information according to various embodiments of the present disclosure.

FIG. 8 is an exemplary diagram illustrating a structure of event information according to various embodiments of the present disclosure.

Referring to FIG. 8, event information 800 may include fields for event type 810, recipient 820, event time 830, message 840, and extension 850.

The event type 810 may indicate the type of an event, and may correspond to characteristics of event information. For example, the event type 810 may be a definition field such as a multipurpose Internet mail extensions (MIME) type of a general message, and may be defined as <Content/type>. Therefore, the event type 810 may define the characteristics of the event information.

In an embodiment, the event type 810 may be any of call, message, email, SNS notification, schedule alarm, and the like.

The recipient 820 may indicate at least one of a user and an electronic device which will receive the event. For example, the recipient 820 may be a specific user or a specific device.

The event time 830 may specify a time related to the event.

The message 840 may provide contents related to the event. For example, the message 840 may be the contents of content corresponding to the event.

The extension 850 may be various additional information related to the event. For example, the extension 850 may be response request information for the event.

Referring to FIG. 7 again, the electronic device 101, for example, the processor 120 may analyze the event information in operation 720, and generate an event profile based on the analyzed event information in operation 730.

According to various embodiments, the electronic device 101 may parse the acquired event information into specific contents by the event information analysis operation, which will be described with reference to FIG. 9.

Figure 9:
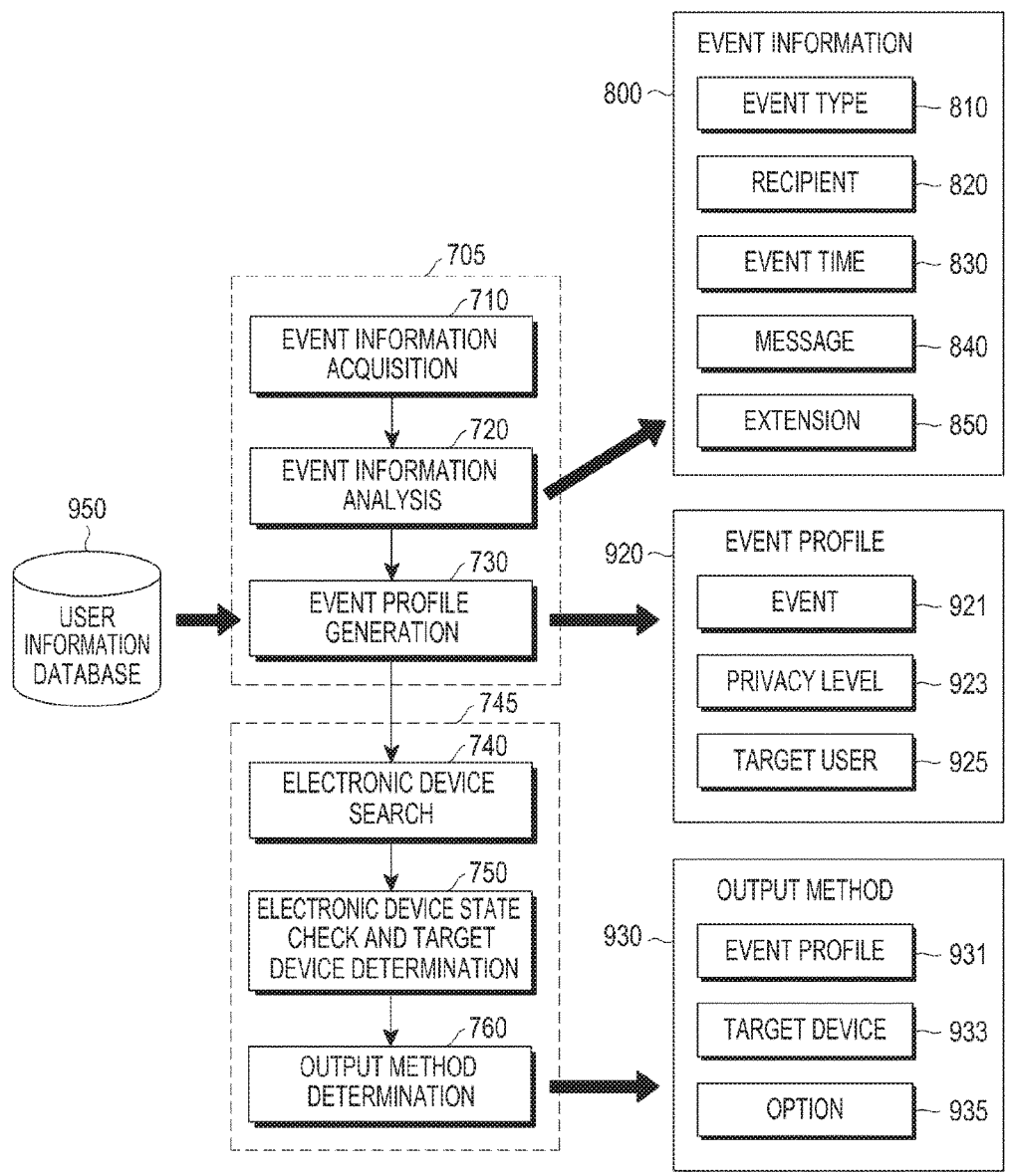
FIG. 9 is a conceptual view illustrating an operation method according to various embodiments of the present disclosure.

FIG. 9 is a conceptual view illustrating an operation method according to various embodiments of the present disclosure.

Referring to FIG. 9, the electronic device 101 may parse the acquired event information 800 into the event type 810, the recipient 820, the event time 830, the message 840, and the extension 850. Therefore, the electronic device 101 may generate an event profile based on the acquired event information in a later-described event profile generation operation.

The electronic device 101 may generate an event profile based on the analyzed event information 800 and a stored user information database 950. For example, the electronic device 101 may generate an event profile 920 including an event 921, a privacy level 923, and a target user 925 based on the analyzed event information 800 and the stored user information database 950.

The event profile may include an event, a privacy level, and a target user.

The event may be various types of information included in the event information, and the privacy level may correspond to the privacy sensitiveness of the event information.

The user information database may be a database about at least one user, stored in the memory 130. For example, the user information database may be a database of user information generated and accumulated from the user of the electronic device 101. The user information database may include information about relationships among a plurality of users. The information about relationships among a plurality of users may refer to information about relationships among a plurality of users using a common electronic device, or information about relationships among persons/objects related to acquired event information. The electronic device 101 may accumulatively store the information about relationships among a plurality of users or the information about relationships among a plurality of persons/objects related to the acquired event information in the user information database.

In an embodiment, the electronic device 101 may store, in the user information database, a condition that health information about son as a third user is to be indicated to mother as a second user. In another embodiment, the electronic device 101 may store, in the user information database, a condition that health information about a person (for example, grandfather other than the user of the electronic device 101) frequently mentioned by the third user is to be shared between father as a first user and mother as the second user.

Besides the information about the relationships among the plurality of users, the electronic device 101 may accumulatively store information about interests of each of the plurality of users. In an embodiment, the electronic device 101 may store, as interest information about mother as the second user, information indicating whether a family member has taken medicine, the number of medications, information about a guest visiting to home, family occasions, new cooking recipes, weather information, information about children's going to and from school, information about study achievements, and the like. In another embodiment, the electronic device 101 may store, as interest information about father as the first user, news feed related to society/economy/sports, weather information, family occasions, and the like. In another embodiment, the electronic device 101 may store, as interest information about son as the third user, entertainment news or SNS-related news.

In operation 745, the electronic device 101 may determine an event output method for outputting the generated event profile. The operation for determining an event output method may include neighbor electronic device search, determination of the states of neighbor electronic devices and determination of a target device, and determination of an output method.

In operation 740, the electronic device 101, for example, the processor 120 may search for an electronic device to output the event information.

For example, the electronic device 101 may search for at least one electronic device corresponding to a target user candidate to receive the event information through the communication module 220. The electronic device 101 may search for the at least one electronic device based on an electronic device database about at least one electronic device, stored in the memory 130, or an electronic device database stored in the server 106. In addition, the electronic device 101 may search for the at least one electronic device through a communication hub (for example, an IoT hub) in an area where the electronic device 101 is located.

In operation 750, the electronic device 101, for example, the processor 120 may check the state of the detected at least one electronic device and determine a target device to receive the event information.

For example, the processor 120 of the electronic device 101 may check information about the type, operation state, position, and ambient environment state of the detected at least one electronic device, and information about at least one user using the detected at least one electronic device.

The operation for checking the state of the detected at least one electronic device may correspond to the afore-described device information acquisition operation.

The electronic device 101 may determine a target device to output the event information from among the detected at least one electronic device, based on the checked state of the at least one electronic device.

The operation for determining a target device to output event information may correspond to the afore-described target device determination operation.

In an embodiment, if the event information is medication administration information, even though the event information is information about an event that has occurred to son as the third user, the electronic device 101 may determine the second user, mother and the third user, son as recipients of the event, so that the event may be indicated to the second user, mother according to a condition stored in the user information database. Therefore, the electronic device 101 may determine electronic devices corresponding to the second user, mother and the third user, son to be target devices.

According to various embodiments, the electronic device 101 may determine a target device based on the positions of an electronic device and a target user to receive the event information, and the distance between the target user and the electronic device.

For example, the electronic device 101 may determine a target device based on at least one of whether the target user wears a wearable device, whether an electronic device corresponding to the target user performs a mirroring operation, and the distance between the target user and the electronic device corresponding to the target user.

The electronic device 101 may determine the position of the electronic device 101 and the position of the electronic device corresponding to the target user, based on a received signal. For example, the electronic device 101 may determine the position of the electronic device 101 based on information about the electronic device paired with the electronic device 101, and may determine the position of the electronic device 101 based on a signal received from an access point (AP) of a predetermined area. Also, the electronic device 101 may determine the position of the electronic device 101 using the communication module 220 (e.g., the GNSS module 227).

Further, the electronic device 101 may determine a target device based on whether the target device is shared or information about at least one user using the target device, which will be described later.

In operation 760, the electronic device 101, for example, the processor 120 may determine an output method for outputting the event information through the determined target device. The output method may correspond to the afore-described event output method, and the operation for determining an output method may correspond to the operation for determining an event output method.

Accordingly, the output method may include at least one of an event output scheme for outputting an event, an event display level, and an event display time. The event output scheme may use at least one of an audio, a video, and text, and the event display level may be a degree to which the contents of the event are displayed. The event display time may be a time at which the event is displayed.

In an embodiment, the electronic device 101 may output the event information visually and output the whole contents of the event, as the event output method.

In another embodiment, the electronic device 101 may output the event information audibly and output part of the contents of the event, as the event output method.

In another embodiment, the electronic device 101 may determine an output time for outputting the event information at the target device, as an output method. For example, if the target device is shared, the electronic device 101 may control the event information not to be output while the target device is shared, according to the privacy level of the output event information. Also, even though the target device is shared, if the event information is common to a user group including a plurality of users sharing the target device, the electronic device 101 may control the target device to output the event information.

In another embodiment, if the output event information is public information, the electronic device 101 may control the public event information to be output through an electronic device within a predetermined range or an electronic device capable of outputting the event information.

According to various embodiments, the electronic device 101, for example, the processor 120 may generate an event output signal for outputting the event according to the determined output method. The event output signal may include information about the determined output method.

Referring to FIG. 9, information about an output method 930 may include an event profile 931, information about a target device 933, and an option 935. The event profile 931 may correspond to the afore-described event profile 920. The information about the target device 933 may be information about the determined target device, and the option 935 may specify at least one of an event output method, an event display level, an event display time, and an output time.

According to various embodiments of the present disclosure, the electronic device 101 may output the event information based on an ambient environment of the target device or the target user. For example, if the target device is performing an operation with priority over event information output or if output of the event information in the ambient environment of the target user may violate the privacy of the user, the electronic device 101 may not output the event information. Further, even though the target device is a common device or is being shared, if output of the event information does not violate the privacy of the user, the electronic device 101 may output the event information. This operation will be described with reference to FIGS. 10 and 11.

Figure 10:
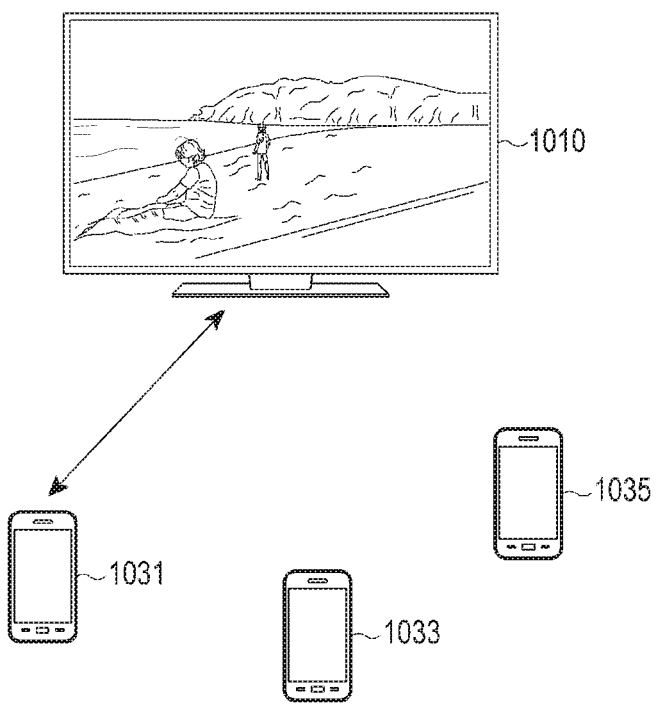
FIGS. 10 and 11 are diagrams illustrating ambient environments of a target device according to various embodiments of the present disclosure.

FIG. 10 is an exemplary diagram illustrating an ambient environment of a target device according to various embodiments of the present disclosure.

Referring to FIG. 10, the electronic device 101 may determine an operation state and ambient environment of a first electronic device 1031 being a target device based on acquired device information. For example, the electronic device 101 may determine that the first electronic device 1031 of a first user being a target user is transmitting a mirroring screen to a display device 1010 based on the acquired device information, and second and third electronic devices 1033 and 1035 corresponding to colleagues of the first user are near to the first electronic device 1031. If event information (for example, a message from son or daughter) to be output to the first electronic device 1031 is associated with the privacy of the first user, the electronic device 101 may control the event information not to be output on the display device 1010 so that the event information may not be exposed to the colleagues being the users of the second and third electronic devices 1033 and 1035. Therefore, the electronic device 101 may control output of the event information only to the display of the first electronic device 101, not to the display device 1010 to which the first electronic device 1031 is mirrored.

Figure 11:
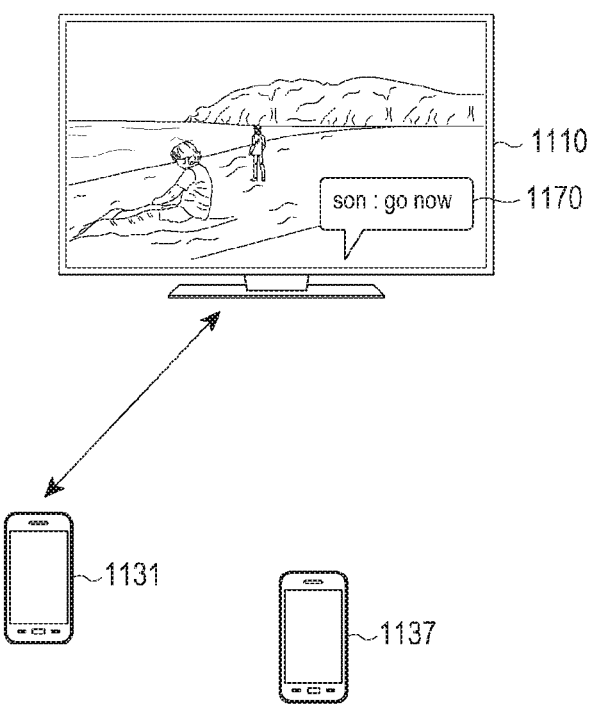

FIG. 11 is an exemplary diagram illustrating an ambient environment of a target device according to various embodiments of the present disclosure.

Referring to FIG. 11, the electronic device 101 may determine an operation state and ambient environment of a fourth electronic device 1131 being a target device based on acquired device information. For example, the electronic device 101 may determine that the fourth electronic device 1131 of a fourth user is transmitting a mirroring screen to a display device 1110, and a fifth electronic device 1137 corresponding to a fifth user being wife of the fourth user is close to the fourth electronic device 1131. If event information (for example, a message from son or daughter) to be output through the fourth electronic device 1131 is related to the privacy of the fourth user, the electronic device 101 may control the event information to be output to the display device 1010 because a user corresponding to the event information (for example, son or daughter), the fourth user, and the fifth user are the same family. Therefore, the electronic device 101 may control display of a message 1170 corresponding to the event information on the display device 1110 to which the fourth electronic device 1131 is mirrored. In addition, the electronic device 101 may control output of the event information on the display of the fourth electronic device 1131.

In this manner, the electronic device 101 according to various embodiments of the present disclosure may control a target device to output event information in consideration of the state and ambient environment of at least one of a target user to receive the event information and a target device to output the event information.

According to various embodiments of the present disclosure, the electronic device 101 may move by means of the driver 191 as described before. Thus, the electronic device 101 may move and directly output acquired event information to a target user. For example, the electronic device 101 may move to the position of a determined target user and output event information to the target user at the moved position audibly or visually. This operation will be described with reference to FIG. 12.

Figure 12:
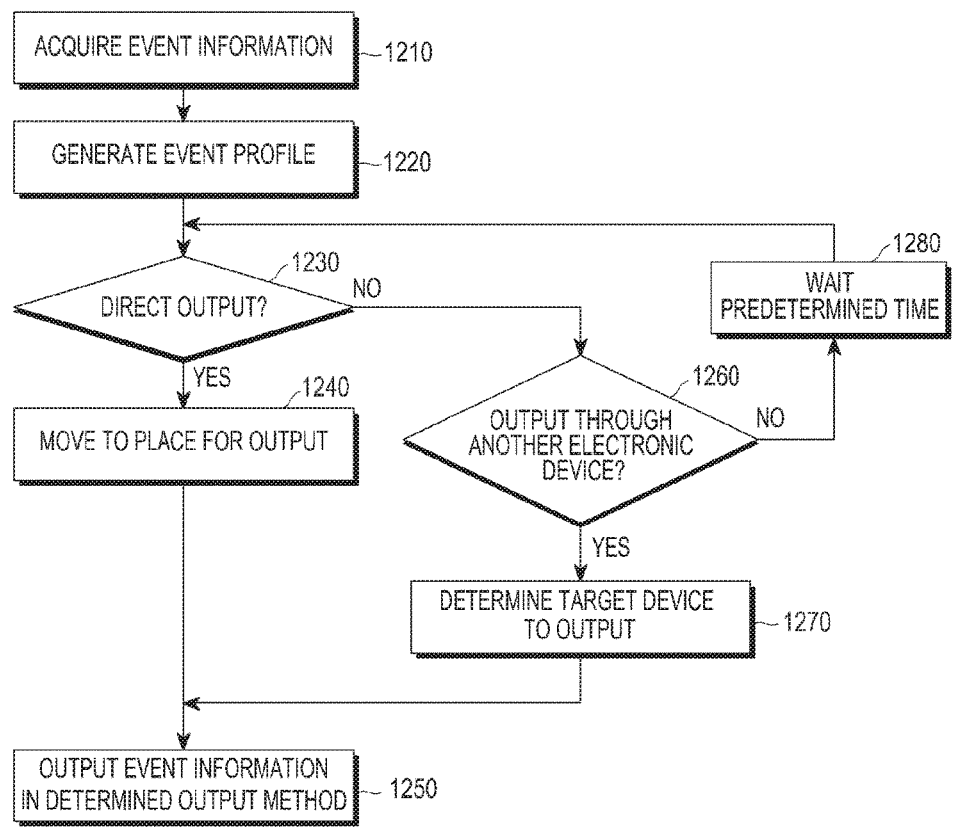
FIG. 12 is a flowchart illustrating a method for operating an electronic device according to various embodiments of the present disclosure.

FIG. 12 is a flowchart illustrating a method for operating an electronic device according to various embodiments of the present disclosure.

Referring to FIG. 12, the electronic device 101, for example, the processor 120 may acquire event information in operation 1210. In operation 1220, the electronic device 101 may generate an event profile based on the acquired event information. Acquisition of event information and generation of an event profile in the electronic device 101 have been described before and thus will not be described in detail herein.

In operation 1230, the electronic device 101, for example, the processor 120 may determine whether to output the acquired event information directly. For example, the electronic device 101 may determine whether to directly output the event information based on the position of a determined target user and acquired device information.

In operation 1240, the electronic device 101 may move to a place where the electronic device 101 will output the event information, by means of the driver 191. For example, the electronic device 101 may move to a place where the target user is located.

In operation 1250, the electronic device 101, for example, the processor 120 may output the event information at the place to which it has moved. For example, the electronic device 101 may output the event information in the moved place in a determined output method. In an embodiment, the electronic device 101 may output the event information in the determined output method through at least one of the display 160 and the speaker 282.

On the other hand, if determining not to directly output the event information, the electronic device 101 may determine whether it is possible to output the event information through another electronic device in operation 1260. For example, the electronic device 101 may determine whether it is possible to output the event information through another electronic device based on the position of the determined target user and the acquired device information.

If it is possible to output the event information through another electronic device, the electronic device 101 may determine a target device to output the event information in operation 1270. In operation 1250, the electronic device 101 may output an event output signal to the target device so that the determined target device may output the event information in the determined output method.

On the contrary, if determining that it is not possible to output the event information through another electronic device, the electronic device 101 may wait for a predetermined time in operation 1280. Then the electronic device 101 may repeat the afore-described operations for determining whether to output event information directly and determining whether it is possible to output event information through another electronic device.

As described above, the electronic device 101 according to various embodiments of the present disclosure may move to the position of a target user of event information and output the event information directly to the target user, or may output the event information through another electronic device.

Specific embodiments of the electronic device 101 according to various embodiments of the present disclosure will be described below with reference to FIGS. 13 and 14.

Figure 13:
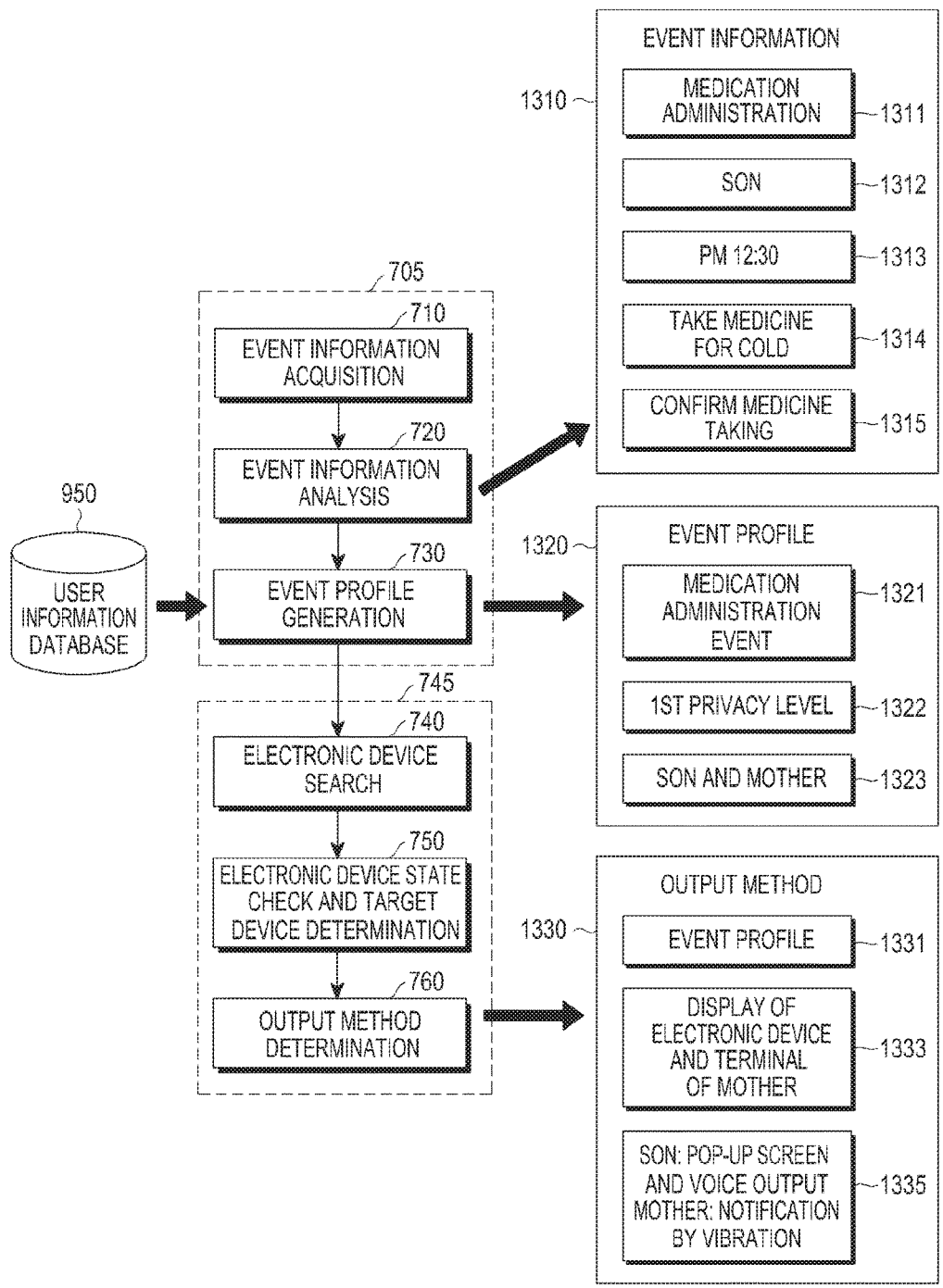
FIG. 13 is a conceptual view illustrating output of a medication administration event according to various embodiments of the present disclosure.

FIG. 13 is a conceptual view of output of a medication administration event according to various embodiments of the present disclosure.

Referring to FIG. 13, the electronic device 101 may perform an operation for processing acquired event information in operation 705. The event processing operation may include an operation for analyzing the event information and an operation for generating an event profile.

In operation 710, the electronic device 101 may acquire event information. In an embodiment, the electronic device 101 may acquire event information in the form of voice from a user through the microphone 288. In another embodiment, the electronic device 101 may acquire event information through the communication module 220. The acquired event information may be a medication administration event.

In operation 720, the electronic device 101, for example, the processor 120 may analyze the acquired event information. The electronic device 101, for example, the processor 120 may parse the acquired event information 1310 and determine that the event type is a medication administration event 1311, the recipient is a son 1312, the event time is 12:30 PM 1313, the message is to take medicine for cold 1314, and the extension is to confirm whether the medicine has been taken 1315.

In operation 730, the electronic device 101, for example, the processor 120 may generate an event profile based on the analyzed event information. The electronic device 101, for example, the processor 120 may generate an event profile 1320 based on the user information database 950 and the acquired event information 1310.

In an embodiment, the electronic device 101 may acquire a condition that health information about the third user, son is to be notified to the second user, mother from the user information database 950. Therefore, the electronic device 101 may generate the event profile 1320 corresponding to the acquired event information 1310 for the medication administration event based on the acquired condition. The event profile 1320 generated by the electronic device 101 may include information indicating that the event is a medication administration event 1321, the privacy level is a first privacy level 1322, and the target users are son and mother 1323.

In operation 745, the electronic device 101 may determine an event output method for outputting the generated event profile. The operation for determining an event output method may include an operation for searching neighbor electronic devices, an operation for determining the states of the neighbor electronic devices and determining a target device, and an operation for determining an output method.

In operation 740, the electronic device 101, for example, the processor 120 may search for an electronic device to output the event information.

For example, the electronic device 101 may search for at least one electronic device corresponding to a target user candidate to receive the event information through the communication module 220. The electronic device 101 may search for the at least one electronic device based on an electronic device database about at least one electronic device, stored in the memory 130, or an electronic device database stored in the server 106. In addition, the electronic device 101 may search for the at least one electronic device through a communication hub (for example, an IoT hub) in an area where the electronic device 101 is located.

In an embodiment, the electronic device 101 may search for an electronic device corresponding to each of son and mother as target users, and may search for an electronic device corresponding to the position of each of son and mother.

In operation 750, the electronic device 101, for example, the processor 120 may check the state of the detected at least one electronic device and determine a target device to receive the event information.

In an embodiment, the processor 120 of the electronic device 101 may check the type, operation state, position, and ambient environment state of the electronic device corresponding to each of son and mother, the type, operation state, position, and ambient environment state of the electronic device corresponding to the position of each of son and mother, and information about at least one user using each of the electronic devices. The electronic device 101 may determine a target device to output the event information from among the detected at least one electronic device, based on the checked state of the at least one electronic device. For example, the electronic device 101 may determine itself as a target device to directly output the event information to son and a terminal of mother as a target device to output the event information to mother.

In operation 760, the electronic device 101, for example, the processor 120 may determine an output method for outputting the event information through the determined target devices. The output method may correspond to the afore-described event output method, and the operation for determining an output method may correspond to the operation for determining an event output method.

In an embodiment, the electronic device 101 may determine display of the event information on a pop-up screen of the display 160 of the electronic device 101 and voice output of the event information through the speaker 282, as an output method for son, and output of the event information by vibrating the terminal of mother, as an output method for mother. The electronic device 101 may include an event profile 1331 for the medication administration event, information indicating the display of the electronic device 101 and a terminal 1333 of mother as target devices, and display of a pop-up screen and voice output for son and vibration notification for mother as an option 1335 in information about the determined output method 1330.

The electronic device 101 may transmit an event output signal to the terminal of mother as a target device so that the event information may be output in the determined output method. Also, the electronic device 101 may move to the position of son, and display the medication administration event on the pop-up screen of the display 160, while outputting the medication administration event by voice through the speaker 282.

According to various embodiments, the electronic device 101 may output event information directly in a language model and a behavior model suitable for a target user based on the afore-described language models and behavior models. For example, the medication administration event information may be output in a friendly language and behavior model matching son as a target user in the above medication administration event.

Figure 14:
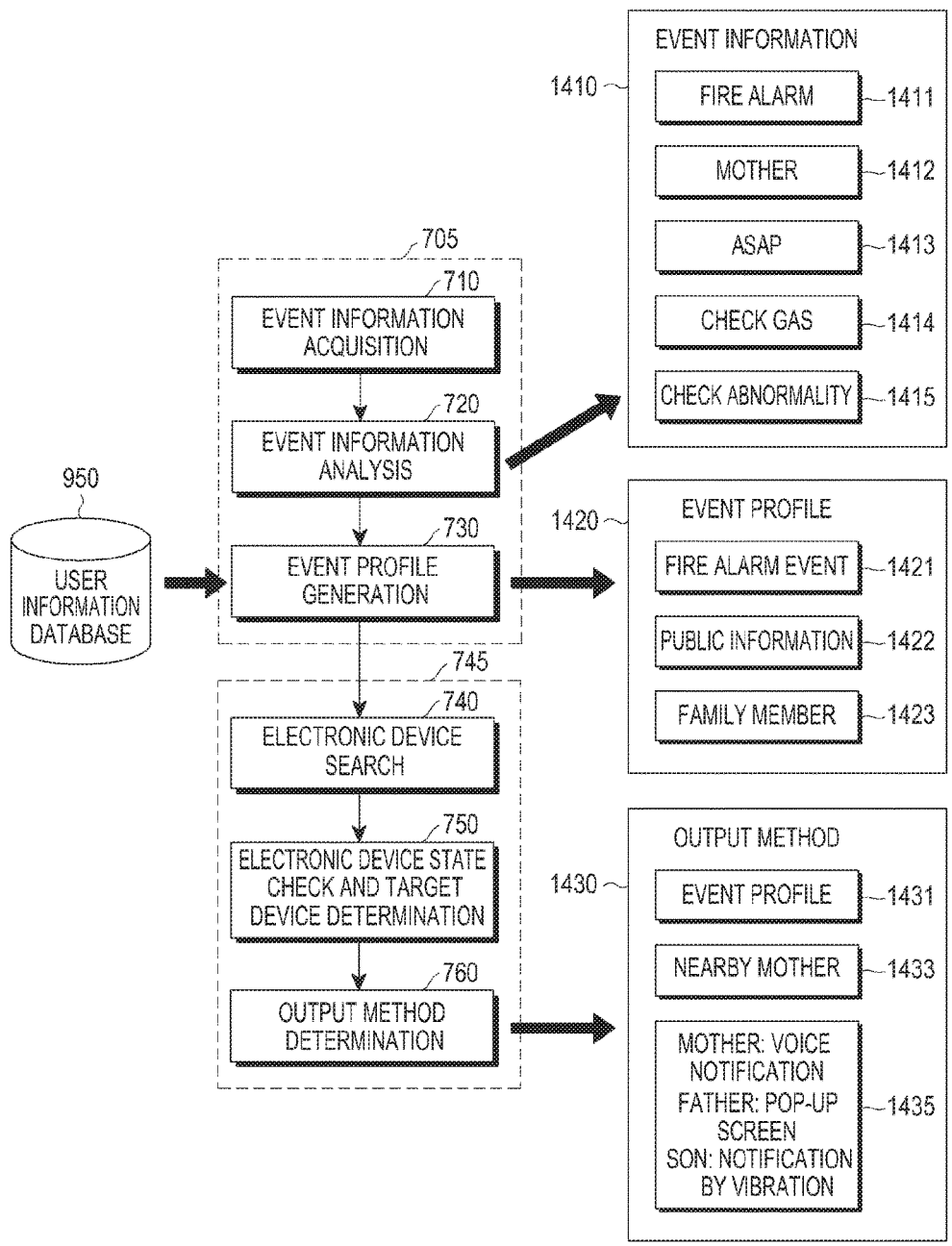
FIG. 14 is a conceptual view illustrating output of a fire alarm event according to various embodiments of the present disclosure.

FIG. 14 is a conceptual view of output of a fire alarm event according to various embodiments of the present disclosure.

Referring to FIG. 14, the electronic device 101 may perform an operation for processing acquired event information. The event processing operation may include an operation for analyzing the event information and an operation for generating an event profile.

In operation 710, the electronic device 101 may acquire event information. In an embodiment, the electronic device 101 may acquire event information in the form of voice from a user through the microphone 288. In another embodiment, the electronic device 101 may acquire event information through the communication module 220. The acquired event information may be a fire alarm event.

In operation 720, the electronic device 101, for example, the processor 120 may analyze the acquired event information. The electronic device 101, for example, the processor 120 may parse the acquired event information 1310 and determine that the event type is a fire alarm event 1411, the recipient is mother 1412, the event time is as soon as possible (ASAP) (for example, urgent) 1413, the message is to check gas 1414, and the extension is to confirm whether gas is abnormal 1415.

In operation 730, the electronic device 101, for example, the processor 120 may generate an event profile based on the analyzed event information. The electronic device 101, for example, the processor 120 may generate an event profile 1420 based on the user information database 950 and the acquired event information 1410.

In an embodiment, the electronic device 101 may generate the event profile 1420 corresponding to the event information 1410 about the fire alarm event. The event profile 1420 generated by the electronic device 101 may include information indicating the event is a fire alarm event 1421, the privacy level is public information 1422, and the target users are a family member and a user 1423 located at a place corresponding to the fire alarm.

In operation 745, the electronic device 101 may determine an event output method for outputting the generated event profile. The operation for determining an event output method may include an operation for searching neighbor electronic devices, an operation for determining the states of the neighbor electronic devices and determining a target device, and an operation for determining an output method.

In operation 740, the electronic device 101, for example, the processor 120 may search for an electronic device to output the event information.

For example, the electronic device 101 may search for at least one electronic device corresponding to a target user candidate to receive the event information through the communication module 220. The electronic device 101 may search for the at least one electronic device based on an electronic device database about at least one electronic device, stored in the memory 130, or an electronic device database stored in the server 106. In addition, the electronic device 101 may search for the at least one electronic device through a communication hub (for example, an IoT hub) in an area where the electronic device 101 is located.

In an embodiment, the electronic device 101 may search for an electronic device corresponding to each of father, mother, and son which are family members as target users, and may search for an electronic device of a user corresponding to the location of the fire alarm.

In operation 750, the electronic device 101, for example, the processor 120 may check the state of the detected at least one electronic device and determine a target device to receive the event information.

In an embodiment, the processor 120 of the electronic device 101 may check information about the type, operation state, position, and ambient environment state of an electronic device corresponding to each of father, mother, and son, the type, operation state, position, and ambient environment state of an electronic device corresponding to the position of each of father, mother, and son, and information about at least one user using the electronic devices. The electronic device 101 may also check information about at least one of the type, operation state, position, and ambient environment state of an electronic device of a user at the position of a fire alarm, and information about at least one user using the electronic device.

The electronic device 101 may determine a target device to output the event information from among the detected at least one electronic device, based on the checked state of the at least one electronic device. For example, the electronic device 101 may determine a terminal of each of father, mother, and son as a target device.

In operation 760, the electronic device 101, for example, the processor 120 may determine an output method for outputting the event information through the determined target devices. The output method may correspond to the afore-described event output method, and the operation for determining an output method may correspond to the operation for determining an event output method.

In an embodiment, the electronic device 101 may determine voice output of the event information through the terminal of mother, as an output method for mother, output of the event information on a pop-up screen of a display of the terminal of father, as an output method for father, and notification of the event information by vibrating the terminal of son, as an output method for son. The electronic device 101 may include an event profile 1431 for the fire alarm event, a terminal 1433 of mother as a target device, and voice notification for mother, pop-up screen display for father, and vibration notification for son as an option 1435 in information about the determined output method 1430.

The electronic device 101 may transmit an event output signal to the terminal of each of father, mother, and son as a target device so that the event information may be output in the determined output methods.

According to various embodiments of the present disclosure, an electronic device may include a memory for storing user information about a plurality of users, and a processor. The processor may be configured to acquire event information about an event sensed by a sensor operatively connected to the electronic device, to determine first and second users from among the plurality of users to be candidate users to receive at least part of the event information, based on at least the user information, to acquire situation information about the electronic device, a first external electronic device corresponding to the first user, or a second external electronic device corresponding to the second user, to select a first electronic device set as a target electronic device from among the electronic device, the first external electronic device, and the second electronic device, if the situation information satisfies a first predetermined condition for the event information, and to select a second electronic device set as a target electronic device from among the electronic device, the first external electronic device, and the second electronic device, if the situation information satisfies a second predetermined condition for the event information, and to provide at least part of the event information to the target electronic device.

According to various embodiments of the present disclosure, the processor may be configured to determine at least one method for providing the at least part of the event information based on the situation information, and to provide the at least part of the event information to the target electronic device using the determined at least one method.

According to various embodiments of the present disclosure, the processor may be configured to determine the method for providing the at least part of the event information, further based on an information providing policy stored in the memory operatively connected to the electronic device.

According to various embodiments of the present disclosure, the electronic device may further include a driver for moving the electronic device, and the processor may be configured to move to a position of the target electronic device by means of the driver based on at least the situation information.

According to various embodiments of the present disclosure, an electronic device may include a memory for storing user information about a plurality of users, and a processor. The processor may be configured to acquire event information about an event sensed by a sensor operatively connected to the electronic device, to determine at least one of the plurality of users to be a candidate user to receive at least part of the event information, based on at least the user information, to acquire situation information about the electronic device or at least one external electronic device corresponding to the candidate user, to provide at least part of the event information to the at least one external electronic device, if the situation information satisfies a predetermined condition for the event information, and not to provide the at least part of the event information to the at least one external electronic device, if the situation information does not satisfy the predetermined condition for the event information.

According to various embodiments of the present disclosure, the processor may be configured to determine at least one method for providing the at least part of the event information based on the situation information, and to provide the at least part of the event information to the at least one external electronic device in the determined at least one method, if the situation information satisfies the predetermined condition.

According to various embodiments of the present disclosure, the processor may be configured to determine the method for providing the at least part of the event information, further based on an information providing policy stored in the memory operatively connected to the electronic device.

According to various embodiments of the present disclosure, an electronic device may include a memory for storing user information about a plurality of users, and a processor connected electrically to the memory. The memory may store instructions configured to, when executed, control the processor to acquire at least one piece of event information, to determine at least one target user to receive the event information from among the plurality of users, based on the stored user information, to acquire device information about at least one of the electronic device and at least one external electronic device corresponding to the determined at least one target user, to determine at least one target device to provide the event information, based on the acquired device information, and to provide an event output signal for outputting the event information, to the determined at least one target device.

According to various embodiments of the present disclosure, the memory may store instructions configured to, when executed, control the processor to output the event information through the determined at least one target device.

According to various embodiments of the present disclosure, the memory may store instructions configured to, when executed, control the processor to determine an event output method for outputting the event information through the determined at least one target device, based on an event output scheme of the determined at least one target device and a privacy level of the event information.

According to various embodiments of the present disclosure, the memory may store instructions configured to, when executed, control the processor to determine an event output method for outputting the event information through the determined at least one target device, based on a distance between the determined at least one target device and the target user.

According to various embodiments of the present disclosure, the memory may store instructions configured to, when executed, control the processor to determine an event output method for outputting the event information through the determined at least one target device, based on information about an ambient environment of the determined at least one target device.

According to various embodiments of the present disclosure, the memory may store instructions configured to, when executed, control the processor to determine an event output method for outputting the event information through the determined at least one target device, based on information about a user group related to at least one user using the determined at least one target device.

According to various embodiments of the present disclosure, the event information may include at least one of a type of the event corresponding to the event information, an event time, an event importance level, event contents, a privacy level, and information about a target user corresponding to the event.

According to various embodiments of the present disclosure, the device information may include at least one of information about a type, an operation state, a position, and an ambient environment of the electronic device or the external electronic device, information about at least one user using the electronic device or the external electronic device, and information about a distance between the user and the electronic device or the external electronic device.

According to various embodiments of the present disclosure, the electronic device may further include a driver, and the memory may store instructions configured to, when executed, control the processor to control the electronic device to a position of the at least one target user by operating the driver, and output the event information.

According to various embodiments of the present disclosure, a method for operating an electronic device may include acquiring at least one piece of event information, determining at least one target user to receive the event information, from among a plurality of users based on stored user information, acquiring device information about at least one of the electronic device and at least one external electronic device corresponding to the determined at least one target user, determining at least one target device to provide the event information, based on the acquired device information, and providing an event output signal for outputting the event information, to the determined at least one target device.

According to various embodiments of the present disclosure, the method may further include determining an event output method for outputting the event information through the determined at least one target device.

According to various embodiments of the present disclosure, the determination of an event output method may include determining an event output method for outputting the event information through the determined at least one target device, based on an event output scheme of the determined at least one target device, and a privacy level of the event information.

According to various embodiments of the present disclosure, the determination of an event output method may include determining an event output method for outputting the event information through the determined at least one target device, based on a distance between the determined at least one target device and the target user.

According to various embodiments of the present disclosure, the determination of an event output method may include determining an event output method for outputting the event information through the determined at least one target device, based on information about an ambient environment of the determined at least one target device.

According to various embodiments of the present disclosure, the determination of an event output method may include determining an event output method for outputting the event information through the determined at least one target device, based on information about a user group related to at least one user using the determined at least one target device.

As is apparent from the foregoing description, according to various embodiments of the present disclosure, when event information is displayed, the event information can be profiled based on user information. Therefore, the event information can be provided effectively to a user. Further, since the position of the user, the position of an electronic device, a position corresponding to the event information, and so on can be considered, the event information can be provided to a user in the most effective manner. Also, the present disclosure may protect the privacy of an individual in an event output method based on the privacy level of the event information.

Each of the components of the above-described electronic device may include one or more parts, and the name of each component may be changed according to the type of the electronic device. According to various embodiments, the electronic device may be configured to include at least one of the afore-described components. A part of the components may be omitted or a new component may be added to the components. Also, a part of the components of the electronic device according to various embodiments may be combined into a single entity which still executes the same functions as executed by the components prior to the combining.

The term 'module' as used herein may include its ordinary meaning including, for example, a unit of one, or a combination of two or more of hardware, software, and firmware. The term 'module' may be used interchangeably with terms such as, for example, unit, logic, logical block, component or circuit. A 'module' may be the smallest unit of an integrated part or a portion thereof. A 'module' may be the smallest unit for performing one or more functions, or a portion thereof. A 'module' may be implemented mechanically, or electronically. For example, a 'module' may include at least one of a known, or to-be-developed, application-specific integrated circuit (ASIC) chip, field-programmable gate array (FPGA) or programmable logic device that perform certain operations.

At least a part of apparatuses (for example, modules or their functions) or methods (for example, operations) according to various embodiments may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a memory for storing user information about a plurality of users; and
a processor, wherein the processor is configured to:
acquire event information about an event sensed by a sensor operatively connected to the electronic device,
determine a first user of the plurality of users corresponding to a recipient of at least part of the event information, determine a second user associated with the first user from among the plurality of users to receive the at least part of the event information, based on at least the user information of the first user and a privacy level of the event information, acquire situation information about the electronic device, a first external electronic device corresponding to the first user, and a second external electronic device corresponding to the second user, select a first electronic device set as a target electronic device from among the electronic device, the first external electronic device, and the second external electronic device based on the situation information associated with a first distance between the electronic device and the first external electronic device, and associated with a second distance between the electronic device and the second external electronic device, and provide the at least part of the event information to the target electronic device.

2. The electronic device of claim 1, wherein the processor is configured to:

determine at least one method for providing the at least part of the event information by using the situation information, and provide the at least part of the event information to the target electronic device using the at least one method.

3. The electronic device of claim 2, wherein the processor is configured to determine the at least one method for providing the at least part of the event information, further based on an information providing policy stored in the memory operatively connected to the electronic device.

4. The electronic device of claim 1, further comprising a driver for moving the electronic device, wherein the processor is configured to move to a position of the target electronic device by means of the driver based on at least the situation information.

5. An electronic device comprising:

a memory for storing user information about a plurality of users; and a processor, wherein the processor is configured to:

acquire event information about an event sensed by a sensor operatively connected to the electronic device, determine at least one of the plurality of users as a candidate user to receive at least part of the event information, based on at least the user information of the at least one of the plurality of users corresponding to a recipient of the at least part of the event information and a privacy level of the event information, acquire situation information about an external electronic device corresponding to the candidate user and about another external electronic device connected with the external electronic device, provide the at least part of the event information to the external electronic device while screen data of the external electronic device is transferred to the another external electronic device, based on the privacy level of the event information satisfying a predetermined condition, and not provide the at least part of the event information to the another external electronic device while the screen data of the external electronic device is transferred to the another external electronic device, based on the privacy level of the event information not satisfying the predetermined condition, wherein the electronic device is external to the external electronic device and the another external electronic device.

6. The electronic device of claim 5, wherein the processor is configured to:

determine at least one method for providing the at least part of the event information by using the situation information, and provide the at least part of the event information to the external electronic device using the at least one method, in response to the situation information corresponding to a predefined condition.

7. The electronic device of claim 6, wherein the processor is configured to determine the at least one method for providing the at least part of the event information, further based on an information providing policy stored in the memory operatively connected to the electronic device.

8. An electronic device comprising:

a memory configured to store user information about a plurality of users; and a processor connected electrically to the memory, wherein the memory is configured to store instructions that, when executed, control the processor to:

acquire event information corresponding to an event, determine a target user from among the plurality of users to receive the event information, based on the user information of a user of the plurality of users corresponding to a recipient of the event information and a privacy level of the event information, in response to determining the target user, acquire device information about the electronic device and an external electronic device corresponding to the target user, determine a target device to provide the event information from among the electronic device and the external electronic device, based on the device information associated with a distance between the electronic device and the external electronic device, and provide an event output signal for outputting the event information, to the target device.

9. The electronic device of claim 8, wherein the memory is configured to store instructions that, when executed, control the processor to output the event information through the target device, and control the processor to determine a method for outputting the event information through the target device, based on an event output scheme of the target device and the privacy level of the event information.

10. The electronic device of claim 9, wherein the memory is configured to store instructions that, when executed, control the processor to determine a method for outputting the event information through the target device, based on a third distance between the target device and the target user.

11. The electronic device of claim 9, wherein the memory is configured to store instructions that, when executed, control the processor to determine a method for outputting the event information through the target device, based on information about an ambient environment of the target device.

12. The electronic device of claim 9, wherein the memory is configured to store instructions that, when executed, control the processor to determine a method for outputting the event information through the target device, based on information about a user group related to the target user using the target device.

13. The electronic device of claim 8, wherein the event information includes at least one of a type of the event, an event time, an event importance level, event contents, the privacy level, and information about the target user.

14. The electronic device of claim 8, wherein the device information includes at least one of information about a type, an operation state, a position, and an ambient environment of the electronic device or the external electronic device, information about the target user, and information about a fourth distance between the target user and the electronic device or the external electronic device.

15. The electronic device of claim 8, further comprising a driver,
wherein the memory is configured to store instructions that, when executed, control the processor to control the electronic device to operate the driver to drive to a position of the target user, and output the event information.

16. A method for operating an electronic device, the method comprising:
acquiring event information;
determining a target user from among a plurality of users to receive the event information, based on stored user information of a user corresponding to a recipient of the event information and a privacy level of the event information;
in response to determining the target user, acquiring device information about at least one of the electronic device and an external electronic device corresponding to the target user;
determining a target device to provide the event information from among the electronic device and the external electronic device, based on the device information associated with a distance between the electronic device and the external electronic device; and
providing an event output signal for outputting the event information, to the target device.

17. The method of claim 16, further comprising determining a method for outputting the event information through the target device, wherein the determination of the method comprises determining the method for outputting the event information through the target device, based on an event output scheme of the target device, and the privacy level of the event information.

18. The method of claim 17, wherein the determination of the method comprises determining the method for outputting the event information through the target device, based on a third distance between the target device and the target user.

19. The method of claim 17, wherein the determination of the method comprises determining the method for outputting the event information through the target device, based on information about an ambient environment of the target device.

20. The method of claim 17, wherein the determination of the method comprises determining the method for outputting the event information through the target device, based on information about a user group related to the target user using the target device.

* * * * *